US008839475B2

(12) United States Patent
Corfield

(10) Patent No.: US 8,839,475 B2
(45) Date of Patent: Sep. 23, 2014

(54) ACCESS UNIT

(75) Inventor: Graham Corfield, Shropshire (GB)

(73) Assignee: Graham Corfield, Shropshire (GB)

( * ) Notice: Subject to any disclaimer, the term of this patent is extended or adjusted under 35 U.S.C. 154(b) by 0 days.

(21) Appl. No.: 13/635,261

(22) PCT Filed: Mar. 15, 2011

(86) PCT No.: PCT/GB2011/050514
§ 371 (c)(1),
(2), (4) Date: Nov. 14, 2012

(87) PCT Pub. No.: WO2011/114147
PCT Pub. Date: Sep. 22, 2011

(65) Prior Publication Data
US 2013/0047352 A1 Feb. 28, 2013

(30) Foreign Application Priority Data

Mar. 16, 2010 (GB) .................................. 1004284.4
Aug. 27, 2010 (GB) .................................. 1014314.7

(51) Int. Cl.
*B64F 1/30* (2006.01)
*B64F 1/305* (2006.01)
*B65G 69/30* (2006.01)
*E01D 15/127* (2006.01)

(52) U.S. Cl.
CPC ................ *B64F 1/305* (2013.01); *B65G 69/30* (2013.01); *E01D 15/127* (2013.01)
USPC ............................................... 14/71.5; 14/73

(58) Field of Classification Search
CPC ........ B65G 69/30; B64F 1/305; E01D 15/127
USPC .................... 14/69.5–72.5; 414/362
See application file for complete search history.

(56) References Cited

U.S. PATENT DOCUMENTS

D146,202 S * 1/1947 Varrieur et al. ................ D34/30
3,664,456 A * 5/1972 Smith et al. ................... 182/62.5
(Continued)

FOREIGN PATENT DOCUMENTS

DE 69 10 924 U 7/1970
DE 19 13 799 A1 10/1970
FR 1 540 444 A 9/1968

OTHER PUBLICATIONS

[Online][retrieved from internet Sep. 14, 2012]: <URL:http://www.kcigse.com/kci-products/boarding-ramps/bar35-passenger-ramp/> p. 1-3.
(Continued)

Primary Examiner — Raymond W Addie
(74) Attorney, Agent, or Firm — Alston & Bird LLP

(57) ABSTRACT

A mobile access unit for allowing passengers to embark or disembark from a craft, such as an aircraft, the unit comprising:
a first moveable ramp section, extending from an entry/exit end, which allows access to the loading door of the craft, to a hinged end, wherein the entry/exit end can rotate about the hinged end, between a raised position and a lowered position;
a second moveable ramp section, extending from a hinged end to a ground entry/exit end, which allows access to the ground, wherein the ground entry/exit end can rotate about the hinged end, between a raised position and a lowered position; and
a non-linear middle ramp section, extending from a first linking end, which links with the hinged end of the first moveable ramp section, to a second linking end, which links with the hinged end of the second moveable ramp section;
wherein the first moveable ramp section, middle ramp section and second moveable ramp section can together form a continuous non-linear ramp that can extend from the craft loading door to the ground, wherein the continuous non-linear ramp includes two or more turns and wherein the sum of the angles turned by the continuous non-linear ramp over its length is 360 degrees or more.

22 Claims, 14 Drawing Sheets

(56) References Cited

U.S. PATENT DOCUMENTS

| | | | | |
|---|---|---|---|---|
| 3,779,596 | A | * 12/1973 | Ritter | 296/179 |
| 3,800,912 | A | * 4/1974 | Ashworth | 182/2.7 |
| 3,910,264 | A | 10/1975 | Mahieu | |
| 4,335,803 | A | * 6/1982 | Sugita | 182/12 |
| 6,668,411 | B1 | 12/2003 | Anderberg | |
| 7,128,186 | B2 | * 10/2006 | Ganiere | 182/63.1 |
| 7,836,536 | B2 | * 11/2010 | Motohashi et al. | 14/71.5 |
| 2003/0077155 | A1 | 4/2003 | Smith | |

OTHER PUBLICATIONS

[Online][retrieved from internet Sep. 14, 2012]: <URL: http://www.raalloy.co.uk/Aviation Products/Aviramp Aircraft Boarding Ramps.html> p. 1-2.

[Online][retrieved from internet Sep. 14, 2012]: <URL: http://www.kcigse.com/kci-products/boarding-ramps/sgr2035ws-fixed-ramp> p. 1-3.

[Online][retrieved from internet Sep. 14, 2012]:<URL: http://http://www.gigablast.com/get?q=kci+passenger+ramp&c=main&d=8008088163 9&cnsp=0> p. 1-2.

International Searching Authority. International Search Report and Written Opinion for International Application No. PCT/GB2011/050514, dated Sep. 7, 2011.

Office Action for Great Britain Application No. GB1004284.4; Dated Nov. 26, 2010.

* cited by examiner

ACCESS UNIT

The present invention relates to a mobile access unit for allowing passengers to embark or disembark from a craft, such as an aircraft.

Generally the present invention is described with reference to the unit being used with aircraft. However, it will be apparent to the skilled reader that the unit is also suitable for use with other craft that are loaded and unloaded with passengers via an entrance/exit that is raised above ground level.

BACKGROUND TO THE INVENTION

When aircraft are being loaded or unloaded it is common to use boarding bridges that lead directly from the aircraft into the terminal building. However, airports increasingly have large numbers of docking locations that are not sufficiently close to the terminal building for these boarding bridges to be used. Further, even when the docking location is close to the terminal building, a direct boarding bridge is not always available.

It is known to use mobile staircases that can be wheeled to the location of the aircraft on the tarmac. These have the advantage of being useable wherever the aircraft docks. These mobile staircases are often used in combination with buses, such that the buses transport the passengers over the distance between the aircraft and the terminal building and the passengers each individually climb the mobile staircase.

For passengers who are less mobile or disabled, these mobile staircases do not provide a useable route for embarking or disembarking the aircraft. Manually lifting and carrying such passengers is sometimes carried out but this is not a desirable solution and presents health and safety issues.

The usual solution to this problem is the provision of a mobile lifting unit that can be brought to the aircraft on request. Such mobile lifting units are able to lift a passenger, such as a passenger in a wheelchair, between ground level and the aircraft door level.

Similar issues may be encountered with respect to loading and unloading passengers from other craft, such as ships (especially cruise liners). Generally, any craft that are loaded and unloaded with passengers via an entrance/exit that is raised above ground level can encounter these types of problem.

SUMMARY OF THE INVENTION

The present invention provides a mobile access unit for allowing passengers to embark or disembark from a craft, such as an aircraft, the unit comprising:
  a first moveable ramp section, extending from a craft entry/exit end, which allows access to the loading door of the craft, to a hinged end, wherein the entry/exit end can rotate about the hinged end, between a raised position and a lowered position;
  a second moveable ramp section, extending from a hinged end to a ground entry/exit end, which allows access to the ground, wherein the ground entry/exit end can rotate about the hinged end, between a raised position and a lowered position;
  a non-linear middle ramp section, extending from a first linking end, which links with the hinged end of the first moveable ramp section, to a second linking end, which links with the hinged end of the second moveable ramp section;
  wherein the first moveable ramp section, middle ramp section and second moveable ramp section can together form a continuous non-linear ramp that can extend from the loading door to the ground.

Generally, this invention provides a beneficial loading/unloading arrangement for any craft that is loaded and unloaded with passengers via an entrance/exit that is raised above ground level, e.g. aircraft, or cruise liners or other ships, in terms of improved efficiency of loading/unloading, reduced stigma for less mobile passengers, and reduced likelihood of accidents.

It was recognised by the inventor that there was a need for a more efficient way of loading and unloading passengers from a craft, especially an aircraft, regardless of the mobility of those passengers. Further, it was recognised that there are accidents on a relatively regular basis that involve children, or parents carrying children, falling from traditional mobile staircases and there can also be accidents involving mobile lifting units.

Additional benefits are particularly found for use of the unit in respect of aircraft. There are usually limited numbers of mobile lifting units in each airport and therefore there can be delays in a requested mobile lifting unit reaching the aircraft. This not only causes frustration and delay for the passenger in question, but also can be costly due to the delays caused in turnaround times for the aircraft. As airlines strive to be more efficient and avoid loss of revenue due to aircraft waiting on the tarmac for suitable lifting equipment, there is a need for a better system of loading and unloading aircraft. The present invention avoids the need for a separate unit for assisting those with restricted mobility and therefore permits faster turnaround times for each aircraft.

The inventor has also identified that there are health and safety issues with the current aircraft arrangements. In case of emergency, an aircraft should be able to evacuate within 90 seconds; this includes when the aircraft is on the tarmac for loading or unloading. With a mobile staircase in place, it is unlikely that any disabled passengers would be evacuated in time. Even some less mobile passengers and people with restricted movement, such as the frail or elderly, might well struggle to leave the aircraft via a conventional mobile staircase in time. In addition, there are accidents on a relatively regular basis that involve children, or parents carrying children, falling from traditional mobile staircases. There can also be accidents involving mobile lifting units.

The present invention therefore provides a mobile access unit for allowing passengers to embark or disembark from an aircraft, the unit comprising:
  a first moveable ramp section, extending from an aircraft entry/exit end, which allows access to the aircraft loading door, to a hinged end, wherein the aircraft entry/exit end can rotate about the hinged end, between a raised position and a lowered position;
  a second moveable ramp section, extending from a hinged end to a ground entry/exit end, which allows access to the ground, wherein the ground entry/exit end can rotate about the hinged end, between a raised position and a lowered position;
  a non-linear middle ramp section, extending from a first linking end, which links with the hinged end of the first moveable ramp section, to a second linking end, which links with the hinged end of the second moveable ramp section;
  wherein the first moveable ramp section, middle ramp section and second moveable ramp section can together form a continuous non-linear ramp that can extend from the aircraft loading door to the ground.

The mobile access unit of the present invention is beneficial in that it allows all passengers, whether fully mobile, less mobile, or disabled, to embark or disembark using the same unit. The unit is mobile and therefore can readily be brought to any aircraft in any location at the airport. Equally, if it is to be used for another craft, such as a cruise liner or other ship, it can be readily be brought to that craft in any location for loading or unloading of that craft, e.g. any location at the docking bay.

It is convenient that all passengers can use the same access unit and furthermore removes any stigma for less mobile and disabled passengers that would be associated with having to use a separate access unit. The delays associated with the loading and unloading of less mobile and disabled passengers using existing systems is removed; all passengers can embark and disembark straight away.

The unit also avoids any concern for children or the elderly regarding walking up or down a mobile staircase, especially during inclement weather such as wind and/or rain. Parents or guardians can allow small children to walk along the continuous non-linear ramp rather than having to consider carrying them up or down a mobile staircase. If desired, a partial or full roof or cover may be fitted to the unit to provide shelter from the elements, but even without this the unit is easier to walk up and down in all weathers.

Further, the unit allows prompt evacuation of an aircraft should this be required, e.g. whilst the aircraft is on the tarmac, or wherever else the aircraft has docked. All passengers, including those in wheelchairs or with less mobility, can easily leave the aircraft via the continuous non-linear ramp. Equally, prompt evacuation of other craft, such as cruise liners or other ships, can also be facilitated using the unit.

The unit can also be used to load and unload equipment for the aircraft, such as food trolleys. This means that the need for a lift to load and unload such equipment can potentially be avoided. Therefore the required storage space for keeping loading/unloading devices at the airport can be reduced. Equally, the unit can also be used to load and unload equipment for any other craft, such as cruise liners or other ships, which use the unit.

There can often be limits as to the linear distance from a craft that is available to be used, or that may be considered safe for passengers to occupy. In the present invention, a non-linear middle section allows the overall length of the ramp to be increased without increasing the linear distance from the craft entry/exit end to the ground entry/exit end. By increasing the overall length of the ramp, a more gradual gradient can be used to move passengers from any given height down to the ground. The unit of the present invention has a sufficiently gradual gradient that it is genuinely useable by all passengers without difficulty, regardless of whether they are mobile, less mobile or wheelchair users. Prior ramp systems have had steep angles of inclination that present difficulties for passengers, both in terms of the exertion required when ascending and lack of stability when descending.

In particular, the use of a non-linear middle section allows the overall length of the ramp to be increased without increasing the linear distance from the aircraft entry/exit end to the ground entry/exit end. This is significant bearing in mind the restricted space around an aircraft that is considered to be safe for passengers to occupy. The longer the overall length of the ramp, the more gradual the gradient that can be used to move passengers from any given height down to the ground.

The invention also provides the use of the mobile access unit of the invention to load passengers onto a craft, e.g. an aircraft.

The invention also provides a method of loading passengers onto a craft, e.g. an aircraft, the method comprising:

providing a mobile access unit according to the invention;
locating the mobile access unit with respect to the craft so that the craft entry/exit end allows access to the loading door of the craft and so that the ground entry/exit end allows access to the ground;
allowing passengers to travel up the continuous non-linear ramp from the ground to the loading door.

The invention also provides the use of the mobile access unit of the invention to unload passengers from a craft, e.g. an aircraft.

The invention also provides a method of unloading passengers from a craft, e.g. an aircraft, the method comprising:

providing a mobile access unit according to the invention;
locating the mobile access unit with respect to the craft so that the craft entry/exit end allows access to the loading door of the craft and so that the ground entry/exit end allows access to the ground;
allowing passengers to travel down the continuous non-linear ramp from the loading door to the ground.

The invention also provides the use of the mobile access unit of the invention to pre-load passengers before actually boarding onto a craft, e.g. an aircraft.

The invention also provides a method of pre-loading passengers before actually boarding onto a craft, e.g. an aircraft, the method comprising:

providing a mobile access unit according to the invention;
locating the mobile access unit with respect to the craft so that the craft entry/exit end allows access to the loading door of the craft and so that the ground entry/exit end allows access to the ground;
allowing passengers to travel up the continuous non-linear ramp from the ground and to wait, e.g. stand, on the continuous non-linear ramp.

The passengers can subsequently be allowed to actually board onto the craft.

In one embodiment, passengers can be loaded onto the unit up to a temporary barrier erected at a chosen point on the ramp. When the craft is fully prepared the temporary barrier can be opened or removed and the passengers can then follow the ramp up to the craft entry/exit end and enter the craft.

DETAILED DESCRIPTION OF THE INVENTION

The following detailed description of the unit is generally set out with reference to the unit being used with an aircraft. However, whilst use with an aircraft is particularly beneficial, it will be immediately appreciated by the skilled reader that the unit could equally be used with other craft, such as cruise liners or other ships. Therefore features described with specific reference to aircraft, may also apply, mutatis mutandis, to other craft that can be loaded and unloaded with passengers via an entrance/exit that is raised above ground level.

The continuous non-linear ramp extending from the aircraft entry/exit end to the ground entry/exit end suitably includes two or more turns. In one embodiment there are three or more turns, e.g. four or more turns, or five or more turns.

The sum of the angles turned by the continuous non-linear ramp over its length is suitably 360 degrees or more. In one embodiment the sum of the angles turned by the continuous non-linear ramp over its length is 450 degrees or more, such as 540 degrees or more, 630 degrees or more, or 720 degrees or more.

Including a significant degree of turn (especially 360 degrees or more, e.g. 450 degrees or more) allows the length of the ramp to be increased, and therefore a more gradual gradient of descent can be used, without increasing the linear distance ('as the crow flies') from the aircraft entry/exit end to the ground entry/exit end. Therefore the unit can still fit in the space adjacent the aircraft.

Further, this degree of turn allows the overall length of the continuous non-linear ramp to be increased and the unit can be used to pre-load passengers. In this regard, there is enough space along the length of the continuous non-linear ramp for significant numbers of passengers to stand before actually boarding onto the aircraft.

The use of the unit to pre-board passengers is beneficial in terms of efficiency and space management. Passengers can, for example, be loaded onto the unit up to a temporary barrier erected at a chosen point on the ramp. When the unit includes a flight of steps, as discussed in more detail below, the temporary barrier may, in one embodiment, be located between the ground entry/exit end and the entry to the flight of steps (preferably just before the entry to the flight of steps), such that staff can access the aircraft by climbing the flight of steps and then following the ramp up to the aircraft entry/exit end whilst pre-boarded passengers wait on the ramp behind the temporary barrier. When the aircraft is fully prepared the temporary barrier can be opened/removed and the passengers can then follow the ramp up to the aircraft entry/exit end and enter the aircraft.

In one preferred embodiment, the sum of the angles turned by the continuous non-linear ramp over its length is 360 degrees or 720 degrees or 1080 degrees. In an alternative preferred embodiment, the sum of the angles turned by the continuous non-linear ramp over its length is 450 degrees or 810 degrees. In an alternative embodiment, the sum of the angles turned by the continuous non-linear ramp over its length is 540 degrees or 900 degrees. In yet another alternative embodiment, the sum of the angles turned by the continuous non-linear ramp over its length is 630 degrees or 990 degrees.

The turns that are comprised within the continuous non-linear ramp may each be any desired angle. The turns may all have the same angle or they may be different. In one embodiment, each turn is independently an angle of 20 degrees or more, such as 30 degrees or more, or 40 degrees or more; for example from 45 to 180 degrees or from 60 to 180 degrees, for example from 90 to 180 degrees.

It can be preferred to use angles of 45 degrees or more, such as 60 degrees or more, or 90 degrees or more, for each turn. This can make the ramp more user-friendly. Turns that are too sharp may be more difficult for passengers, especially those in wheelchairs, to navigate.

The continuous non-linear ramp extending from the aircraft entry/exit end to the ground entry/exit end preferably includes one or more turn that is 90 degrees or more, preferably two or more, for example three or more, four or more, or five or more turns that are 90 degrees or more. The use of turns that are 90 degrees or more can allow a ramp shape to be readily obtained that involves one or more complete turns over its length. This allows a more gradual gradient of descent to be used, by increasing the overall ramp length, whilst not increasing the linear distance from the aircraft entry/exit end to the ground entry/exit end.

In one embodiment, all of the turns that are 90 degrees or more are either 90 degree turns or 180 degree turns.

In such one embodiment, some of the turns that are 90 degrees or more are 90 degree turns and some of the turns that are 90 degrees or more are 180 degree turns. In an alternative embodiment, all of the turns that are 90 degrees or more are 90 degree turns. In another alternative embodiment, all of the turns that are 90 degrees or more are 180 degree turns.

The continuous non-linear ramp extending from the aircraft entry/exit end to the ground entry/exit end may optionally include one or more 180 degree turn, preferably two or more 180 degree turns, such as three or more 180 degree turns, for example four or more 180 degree turns. The use of two or more 180 degree turns has been found to provide a unit that has an excellent ratio of actual ramp length to ground surface area occupied by the unit, therefore providing a product that fits in the required space beside the aircraft, is compact enough to potentially be moved by a one-man operation, is long enough to allow pre-boarding of significant numbers of passengers, and has a ramp angle that is readily useable by the disabled and infirm as well as able bodied passengers.

The continuous non-linear ramp extending from the aircraft entry/exit end to the ground entry/exit end may optionally include one or more 90 degree turn, for example two or more 90 degree turns.

In one embodiment, the continuous non-linear ramp only includes turns that are 90 degree turns or 180 degree turns. This is beneficial in terms of the overall length of ramp that can be achieved within a given space. It allows a long length of ramp to be achieved within a relatively small area, in particular within the area adjacent an aircraft that is deemed to be safe.

In one embodiment, all of the turns in the continuous non-linear ramp are part of the non-linear middle section. However, in another embodiment, some of the turns in the continuous non-linear ramp are not entirely part of the non-linear middle section. Some of the turns in the continuous non-linear ramp may be partly or fully provided in the first moveable ramp section and/or the second moveable ramp section.

Preferably, some of the turns in the continuous non-linear ramp are provided by the way the non-linear middle section joins with the first moveable ramp section and/or the second moveable ramp section. As the skilled reader will appreciate, some turn may be incorporated by the non-linear middle section not joining the first moveable ramp section in the direction of passenger travel but rather at an angle. Equally, as an alternative or additional feature, some turn may be incorporated by the second moveable ramp section not joining the non-linear middle section in the direction of passenger travel but rather at an angle.

In one embodiment, the non-linear middle section joins the first moveable ramp section at an angle to the direction of travel, e.g. an angle of 90 degrees. In one embodiment, this is combined with the non-linear middle section having a turn, e.g. a 90 degree turn, at or near its first linking end, so as to create a larger degree of turn.

In one embodiment, the combined degree of turn, at or near where the non-linear middle section joins the first moveable ramp section, is 90 degrees or 180 degrees. This turn may be attributable entirely to the angle at which the non-linear middle section joins the first moveable ramp section, or may be attributable entirely to the non-linear middle section having a turn at or near its first linking end, or may be attributable to a combination of the angle at which the non-linear middle section joins the first moveable ramp section and the non-linear middle section having a turn at or near its first linking end.

In one embodiment, the second moveable ramp section joins the non-linear middle section at an angle to the direction of travel, e.g. an angle of 90 degrees. In a preferred such embodiment, this is combined with the non-linear middle section having a turn, e.g. a 90 degree turn, at or near its second linking end, so as to create a larger degree of turn.

In one embodiment, the combined degree of turn, at or near where the second moveable ramp section joins the non-linear middle section, is 90 degrees or 180 degrees. This turn may be attributable entirely to the angle at which the second moveable ramp section joins the non-linear middle section, or may be attributable entirely to the non-linear middle section having a turn at or near its second linking end, or may be attributable to a combination of the angle at which the second moveable ramp section joins the non-linear middle section and the non-linear middle section having a turn at or near its second linking end.

Thus in one preferred embodiment, the second moveable ramp section joins the non-linear middle section at an angle to the direction of travel, to create a combined degree of turn at this join of 90 degrees or 180 degrees.

In an alternative preferred embodiment, the second moveable ramp section joins the non-linear middle section in the direction of travel. Preferably this join is linear rather than a turn being created at this join, i.e. the combined degree of turn at this join is zero degrees.

In one embodiment, the non-linear middle section includes one or more 180 degree turn, for example two or more 180 degree turns. In one embodiment, the non-linear middle section includes one or more 90 degree turn, for example two or more 90 degree turns, or three or more 90 degree turns.

The use of one or more 180 degree turns in the non-linear middle section has been found to provide a unit that has an excellent ratio of actual ramp length to ground surface area occupied by the unit, therefore providing a product that fits in the required space beside the aircraft, is compact enough to potentially be moved by a one-man operation, is long enough to allow pre-boarding of significant numbers of passengers, and has a ramp angle that is readily useable by the disabled and infirm as well as able bodied passengers.

In particular, as it is the non-linear middle section that is the main part of the ramp that will be occupied during pre-boarding, it is significant that this includes a significant degree of turn, and especially that there is at least one turn in the non-linear middle section which is a 180 degree turn, in order that it is long enough to allow pre-boarding of significant numbers of passengers, whilst having a ramp angle that is readily useable by the disabled and infirm as well as able bodied passengers.

It could be that the second moveable ramp section is slightly steeper, as this ramp section can be made relatively short in length if desired, and therefore the impact of this section having a higher ramp angle is less significant. However, the ramp angle of the non-linear middle section is highly significant if the unit is to be able to be used for pre-boarding and the disabled and infirm. Accordingly, the presence of one or more turns, especially at least one 180 degree turn, within the non-linear middle section is relevant.

In one preferred embodiment, the non-linear middle section includes a 90 degree turn at or near its first linking end and the non-linear middle section is straight at its second linking end. In one such embodiment, the non-linear middle section further includes one or more additional turn that is 90 degrees or more, such as two or more, or three or more, or four or more, turns that are 90 degrees or more. It may be that one or more of the additional turns is a 180 degree turn, for example there may be one or two 180 degree turns. It may, alternatively or additionally, be that one or more of the additional turns is a 90 degree turn, for example there may be one or two 90 degree turns. In one embodiment, one or more of the additional turns is a 180 degree turn, and one or more of the additional turns is a 90 degree turn; for example the additional turns may be two 180 degree turns and two 90 degree turns. In one embodiment, the additional turn is a 180 degree turn.

In one such embodiment, the non-linear middle section: includes a 90 degree turn at or near its first linking end; is straight at its second linking end; and further includes two 180 degree turns; and further includes two 90 degree turns. Preferably the first moveable ramp section joins the non-linear middle section to create a combined degree of turn at the join of 180 degrees and the second moveable ramp section joins the non-linear middle section such that this join is linear.

In another such embodiment, the non-linear middle section: includes a 90 degree turn at or near its first linking end; is straight at its second linking end; and further includes one 180 degree turn. Preferably the first moveable ramp section joins the non-linear middle section at 90 degrees to create a combined degree of turn at the join of 180 degrees and the second moveable ramp section joins the non-linear middle section at 90 degrees, to create a combined degree of turn at the join of 90 degrees. In an alternative preferred arrangement, however, the first moveable ramp section joins the non-linear middle section at 90 degrees to create a combined degree of turn at the join of 180 degrees and the second moveable ramp section joins the non-linear middle section such that this join is linear.

In an alternative embodiment, the non-linear middle section includes a 90 degree turn at or near its first linking end and includes a 90 degree turn at or near its second linking end. In one such embodiment, the non-linear middle section further includes one or more additional turn that is 90 degrees or more, such as two or more, or three or more, turns that are 90 degrees or more. It may be that one or more of the additional turns is a 180 degree turn, for example there may be one or two 180 degree turns. It may, alternatively or additionally, be that one or more of the additional turns is a 90 degree turn, for example there may be one or two 90 degree turns. In one embodiment, one or more of these additional turns is a 180 degree turn, and one or more of these additional turns is a 90 degree turn; for example the additional turns may be one 180 degree turn and two 90 degree turns. In another embodiment, one or more of these additional turns is a 180 degree turn; for example the additional turns may be one 180 degree turn.

In one such embodiment, the non-linear middle section: includes a 90 degree turn at or near its first linking end; includes a 90 degree turn at or near its second linking end; and further includes one 180 degree turn. Preferably the first moveable ramp section joins the non-linear middle section to create a combined degree of turn at the join of 180 degrees and the second moveable ramp section joins the non-linear middle section to create a combined degree of turn at the join of 90 degrees.

In one embodiment, the first turn in the continuous non-linear ramp is a right handed turn. This is advantageous in terms of moving the space occupied by the unit away from the aircraft engine.

In one embodiment, the turns in the continuous non-linear ramp are a combination of right handed turns and left handed turns. In one such embodiment, the turns in the continuous non-linear ramp alternate between right handed turns and left handed turns or alternate between left handed turns and right handed turns. This is beneficial in terms of the overall length of ramp that can be achieved. It allows a long length of ramp to be achieved within a relatively small area, in particular within the area adjacent an aircraft that is deemed to be safe.

In one preferred embodiment, the turns in the continuous non-linear ramp alternate between right handed turns and left handed turns, i.e. the first turn is in a right handed direction. This is advantageous in terms of moving the space occupied by the unit away from the aircraft engine. However, the skilled reader will appreciate that the reverse scenario might be preferred, i.e. the first turn would be in a left handed direction and the turns alternate between left handed turns and right handed turns, if the unit was intended for use at the rear door of an aircraft.

In one embodiment, the continuous non-linear ramp is shaped such that it extends over one complete turn or multiple complete turns. Therefore in one embodiment, the continuous non-linear ramp is shaped such that it exhibits n complete turns, where n is an integer, such as an integer from 1 to 5, for example 1, 2, 3 or 4. In one such preferred embodiment n is 1 or 2 or 3, i.e. the continuous non-linear ramp is shaped such that it exhibits exactly one or two or three complete turns. In one most preferred version n is 2.

In another preferred embodiment, the continuous non-linear ramp is shaped such that it extends over one or more complete turn plus a quarter turn, such as one and a quarter turns or two and a quarter turns. Therefore in one such embodiment, the continuous non-linear ramp is shaped such that it exhibits n complete turns, where n is selected from 1.25 and 2.25.

The non-linear middle section preferably has a fixed inclination. The non-linear middle section may be a ramp having an angle of inclination of 10 degrees or less. The non-linear middle section may suitably be a ramp having an angle of inclination of 9 degrees or less. The non-linear middle section may preferably be a ramp having an angle of inclination of 8 degrees or less, e.g. from 2 to 8 degrees, such as 7 degrees or less, e.g. from 2 to 7 degrees. In one embodiment, the non-linear middle section may be a ramp having an angle of inclination of from 3 to 6 degrees, such as from 4.5 to 5.5 degrees, e.g. 5.3 degrees. In another embodiment, the non-linear middle section may be a ramp having an angle of inclination of from 3 to 8 degrees, such as from 5 to 8 degrees, e.g. 5.7 degrees, or from 6 to 8 degrees.

The first moveable ramp section may be substantially linear. The second moveable ramp section may be substantially linear. In one preferred embodiment, the first moveable ramp section and the second moveable ramp section are both substantially linear.

In one preferred embodiment, the direction of travel of a passenger at the aircraft entry/exit end and the direction of travel of a passenger at the ground entry/exit end may be substantially the same (e.g. within 5 degrees of each other, or within 2 degrees of each other, or within 1 degree of each other).

In an alternative embodiment, the direction of travel of a passenger standing at the aircraft entry/exit end and the direction of travel of a passenger standing at the ground entry/exit end may be substantially opposite, i.e. they may be separated by substantially 180 degrees (e.g. 180 degrees±5 degrees, or 180 degrees±2 degrees, or 180 degrees±1 degree).

In another alternative embodiment, the direction of travel of a passenger standing at the aircraft entry/exit end and the direction of travel of a passenger standing at the ground entry/exit end may be substantially perpendicular, i.e. they may be separated by substantially 90 degrees (e.g. 90 degrees±5 degrees, or 90 degrees±2 degrees, or 90 degrees±1 degree). The separation may be substantially 90 degrees clockwise or substantially 90 degrees anticlockwise.

In one preferred such embodiment, the direction of travel of a passenger standing at the aircraft entry/exit end and the direction of travel of a passenger standing at the ground entry/exit end may be separated by substantially 90 degrees clockwise.

In one embodiment, the first moveable ramp section and the second moveable ramp section are both substantially linear and lie in the substantially parallel planes. In this regard, substantially parallel planes are planes that are at an angle of five degrees or less to each other, e.g. two degrees or less, or one degree or less.

In one preferred embodiment, the continuous non-linear ramp extending from the aircraft entry/exit end to the ground entry/exit end is shaped such that the direction of travel of a passenger at the aircraft entry/exit end is the same as the direction of travel of the passenger at the ground entry/exit end. In other words, the continuous non-linear ramp extends over one complete turn or multiple complete turns. Therefore in one embodiment, the continuous non-linear ramp is shaped such that it exhibits n complete turns, where n is an integer, such as an integer from 1 to 5, for example 1, 2, 3 or 4. In one preferred embodiment n is 1 or 2 or 3, i.e. the continuous non-linear ramp is shaped such that it exhibits exactly one or two or three complete turns. Most preferably n is 2.

In another preferred embodiment, the continuous non-linear ramp extending from the aircraft entry/exit end to the ground entry/exit end is shaped such that the direction of travel of the passenger at the ground entry/exit end is 90 degrees clockwise from the direction of travel of a passenger at the aircraft entry/exit end. In other words, the continuous non-linear ramp extends over one or more complete turn plus a quarter turn, such as one and a quarter turns or two and a quarter turns.

The aircraft entry/exit end can be rotated about the hinged end of the first moveable ramp section, between a raised position and a lowered position, therefore allowing adjustment to match the height of the aircraft loading door in relation to the ground. The raised position and the lowered position may suitably be about a meter or more apart (e.g. they may be from 0.9 m to 1.5 m apart) so as to cover the range of heights of aircraft loading doors, in relation to the ground, found in different sizes of aircraft. However, it will be appreciated that a unit could be provided that was intended for use only with certain aircraft types and therefore a smaller range could be appropriate, for example 0.9 m or less, e.g. from 0.5 to 0.8 m.

In one embodiment the angle between the raised position and the lowered position may be up to about 20 degrees, e.g. up to about 18 degrees. The angle between the raised position and the lowered position may suitably be up to about 16 degrees, such as up to about 14 degrees, for example from about 4 to about 14 degrees, or from about 6 to 12 degrees, e.g. from about 9 to about 11 degrees, e.g. 10.6 degrees.

Preferably, in use, the aircraft entry/exit end can be rotated to a position that is substantially horizontal. Preferably, in use, the aircraft entry/exit end can be rotated to a position that is above the horizontal. Preferably, in use, the aircraft entry/exit end can be rotated to a position that is below the horizontal.

In one embodiment, in use, the raised position of the aircraft entry/exit end is at an angle x above the horizontal and the lowered position of the aircraft entry/exit end is at angle y below the horizontal. It may be that x is 10 degrees or less and y is 10 degrees or less. It may be that x is 9 degrees or less and y is 9 degrees or less. In one embodiment, x is 8 degrees or less, such as 7 degrees or less, e.g. from 2 to 6 degrees or from 3 to 5.5 degrees, e.g. 5.3 degrees. In one embodiment, x is from 3 to 8 degrees, such as from 5 to 8 degrees, e.g. 5.7 degrees, or from 6 to 8 degrees. In one embodiment, y is 8 degrees or less, such as 7 degrees or less, e.g. from 2 to 6 degrees or from 3 to 5.5 degrees, e.g. 5.3 degrees. In one embodiment, y is from 3 to 8 degrees, such as from 5 to 8 degrees, e.g. 5.7 degrees, or from 6 to 8 degrees. In one embodiment, x and y are the same.

The aircraft entry/exit end can be rotated about the hinged end, between a raised position and a lowered position, by any suitable height adjustor system. Suitable systems include mechanical, electrical, electronic, pneumatic or hydraulic systems. In one embodiment, the height adjustor system comprises one or more winch and/or one or more jack. In one embodiment, the height adjustor system comprises a hydraulic ram, such as a hydraulic ram on a pawl lock system.

It will be appreciated that there are benefits in using systems that do not rely entirely on electrical or electronic components, as this permits the unit to function in a broader range of temperatures and conditions. In one embodiment, the system does not comprise any electrical or electronic components. In another embodiment the system the system does comprise electrical or electronic components, but further comprises a backup system that does not comprise any electrical or electronic components.

The system may be powered from a portable power unit, such as a battery, and/or may be powered from the aircraft engine. It could alternatively or additionally be solar powered. Preferably, the system is manually, hydraulically or pneumatically powered.

The unit may suitably be provided with a lock system for the aircraft entry/exit end that allows it to be locked in any desired position, including the raised position, the lowered position, and any position in between. It may be that the lock system comprises a set of corresponding male and female engaging components, such as a set of holes and one or more corresponding pins. The holes can be located at pre-set positions such that when a pin is engaged in a given hole, the aircraft entry/exit end is locked in a given desired position.

The first moveable ramp section may optionally be provided with a platform extending from the aircraft entry/exit end. The platform can, in use, be the portion of the unit that actually contacts the aircraft, forming a bridge between the aircraft and the rest of the unit. Preferably, it is the only portion of the unit that actually contacts the aircraft in use, therefore minimising the chance of damage to the aircraft.

This platform can be a detachable platform, or can be an integral platform. The platform may, in one embodiment, be moved between a non-engaging position and an engaging position, where the platform contacts the aircraft. In this regard, the platform may rotate about a hinge in order to move between a non-engaging position and an engaging position, or may slide between a non-engaging position and an engaging position, for example the platform may move telescopically between a non-engaging position and an engaging position. It is also possible that the platform is moved into an engaging position, where the platform contacts the aircraft, by movement of the unit towards the aircraft, for example by the unit being manually pushed towards the aircraft.

The platform may, in one embodiment, be static with respect to the unit and therefore the platform is moved into an engaging position, where the platform contacts the aircraft, by movement of the unit towards the aircraft.

The platform may be provided with a swivel plate, so that if the platform approaches the aircraft at an angle the swivel plate will contact the aircraft on one edge and then swivel until it aligns with the aircraft.

The platform may, in use, be provided at the same angle to the horizontal as the first moveable ramp section. Alternatively, the platform may, in use, be provided at a different angle to the horizontal as the first moveable ramp section. For example, the platform may, in use, be provided so as to be substantially horizontal (e.g. horizontal±1 degree). It is preferred that the platform is, in use, provided at an angle to the horizontal of from 0 to 8 degrees.

The platform may suitably have padding at all areas that contact the aircraft, for example all areas that contact the aircraft may be made from a soft material such as rubber or foam. Thus in one embodiment it may have a rubber buffer to protect the aircraft.

The platform may optionally be provided with one or more proximity sensor that prevents further movement of the platform towards the aircraft when it reaches a set proximity, in order to prevent damage to the aircraft.

In an alternative embodiment, the first moveable ramp section is not provided with a platform extending from the aircraft entry/exit end and the aircraft entry/exit end is, in use, the portion of the unit that actually contacts the aircraft, forming a bridge between the aircraft and the rest of the unit. The aircraft entry/exit end may suitably have padding at all areas that contact the aircraft, for example all areas that contact the aircraft may be made from a soft material such as rubber or foam. The aircraft entry/exit end may be rotated about its hinged end in order to move between a non-engaging position and a position where it is engaged with the aircraft, or the unit may simply be moved towards the aircraft, for example by the unit being manually pushed towards the aircraft, to cause engagement.

The unit may be provided with any suitable support structure for bearing load. Preferably, the support structure bears load from at least the non-linear middle ramp section.

In one embodiment, the unit is provided with at least one support tower that bears load. It may be that the first support tower that bears load is a support tower that bears load from at least the non-linear middle ramp section.

In one embodiment, the first support tower that bears load is a support tower that bears load from at least one turn in the non-linear middle ramp section; in one embodiment this turn is a 180 degree turn.

In one preferred embodiment, the unit further comprises a second support tower that bears load. This second tower may suitably bear load from at least the first moveable ramp section.

In one embodiment, the second support tower that bears load is a support tower that bears load from at least the join between the first moveable ramp section and the non-linear middle ramp section, wherein this join is preferably a 180 degree turn.

In one embodiment, the first support tower bears load from the non-linear middle ramp section, e.g. from at least one turn in the non-linear middle ramp section, extending from the non-linear middle ramp section down to ground level, and the second support tower bears load from the first moveable ramp section, e.g. at least the join between the first moveable ramp section and the non-linear middle ramp section, extending from the first moveable ramp section down to ground level.

The first support tower and the second support tower preferably are aligned in substantially the same plane.

In one embodiment, the first support tower bears load from at least the first linking end of the non-linear middle ramp section and the hinged end of the first moveable ramp section. It may be that the first support tower extends from the first linking end of the non-linear middle ramp section and the hinged end of the first moveable ramp section down to ground level.

In one embodiment, the second support tower bears load from at least the aircraft entry/exit end of the first moveable ramp section. It may be that the second support tower extends from the aircraft entry/exit end of the first moveable ramp section to ground level.

In one embodiment, the second support tower is height adjustable, wherein adjustment of the height of this tower moves the aircraft entry/exit end between its raised position and its lowered position. In other words, adjustment of the height of the second support tower alters the angle of inclination of the first moveable ramp section.

In this embodiment, the second support tower may have its height adjusted by any suitable height adjustor system, in particular those mentioned above. For example, one or more winch may alter the height of the tower and consequently the angle of inclination of the first moveable ramp section.

In one embodiment, the first support tower and/or the second support tower may be modular, so it can be dismantled and packed in a container.

In one embodiment, there may more than two support towers. It may, for example, be that there is a support tower that bears load from at least one turn in the non-linear middle ramp section; a support tower that bears load from at least the join between the first moveable ramp section and the non-linear middle ramp section; and a support tower bears load from at least the aircraft entry/exit end of the first moveable ramp section.

Where there is more than one support tower, these may join together to form a continuous support structure.

The unit may be provided with one or more support sections to provide support for load. These support sections may extend underneath some or all of the first moveable ramp section and/or some or all of the second moveable ramp section and/or some or all of the non-linear middle ramp section. These support sections may be used in combination with the first support tower and/or the second support tower as discussed above, and may therefore provide support in addition to the support provided by the first support tower and, if present, the second support tower.

The ground entry/exit end can be rotated about the hinged end of the second moveable ramp section, between a raised position and a lowered position, therefore allowing movement of the second moveable ramp section from a position where it is raised off the ground, to aid transportation of the unit, to a lowered position where it contacts the ground.

The angle between the raised position and the lowered position may suitably be 110 degrees or less, preferably from about 5 to 105 degrees, e.g. from about 5 to 100 degrees or from about 10 to 98 degrees, such as from about 15 to 95 degrees.

In one embodiment, in use, the ground entry/exit end can be rotated to a raised position that is substantially horizontal or above the horizontal. Alternatively, the raised position may be below the horizontal but sufficiently raised that it does not touch the ground and therefore aids transport of the unit. Preferably, in use, the ground entry/exit end can be rotated to a raised position that is substantially vertical.

In one embodiment, in use, the ground entry/exit end can be rotated to a lowered position that is below the horizontal, such that it touches the ground.

In one embodiment, in use the lowered position of the ground entry/exit end is at angle z to the ground. In one embodiment, z is 10 degrees or less, e.g. 9 degrees or less, such as 8 degrees or less, or 7 degrees or less, such as from 2 to 6 degrees, for example from 4.5 to 5.5 degrees, e.g. 5.3 degrees to the ground. In one embodiment, z is from 3 to 8 degrees, such as from 5 to 8 degrees, e.g. 5.7 degrees, or from 6 to 8 degrees.

The ground entry/exit end can be rotated about the hinged end, between a raised position and a lowered position, by any suitable height adjustor system. Suitable systems include manual, mechanical, electrical, electronic, pneumatic or hydraulic systems. In one embodiment, the height adjustor system comprises one or more winch and/or one or more jack. In one embodiment, the height adjustor system comprises a hydraulic pump which in turn drives a hydraulic motor.

In a preferred embodiment, the ground entry/exit end can be rotated about the hinged end, between a raised position and a lowered position, by being manually lifted or lowered.

As noted above, there are benefits in using systems that do not rely entirely on electrical or electronic components, due to this allowing the unit to function in a broader range of temperatures and conditions. In one embodiment, the system does not comprise any electrical or electronic components. In another embodiment the system the system does comprise electrical or electronic components, but further comprises a backup system that does not comprise any electrical or electronic components.

The system may be powered from a portable power unit, such as a battery or a small diesel engine. However, preferably the system is manually powered.

The unit may suitably be provided with a lock system for the ground entry/exit end that allows it to be locked in the raised position. This may, for example, be a system involving a hook or catch, or a system that involves a set of corresponding male and female engaging components, such as a set of holes and one or more corresponding pins.

The lock system for the ground entry/exit end may also allow it to be locked in the lowered position, or a separate lock system for locking the ground entry/exit end in the lowered position may be provided. However, as the lowered position is intended to be a position where the ground entry/exit end touches the ground, gravity could instead be relied upon.

The unit may be provided with any suitable movement aids to permit movement of the unit, such as wheels or runners. Preferably, the unit is provided with one or more wheels for allowing movement of the unit, such as two or more wheels, e.g. three or more wheels, or four or more wheels.

It could be that the movement aids, such as wheels, are permanently attached to the unit or they could be removable.

In one embodiment the unit has at least four wheels, with two wheels spaced either side of the first support tower and two wheels spaced either side of the second support tower.

The unit may be provided with a steering mechanism. The steering mechanism may involve control of the direction one or more, preferably two or more, of the movement aids. The steering mechanism may be controlled by a handle. Preferably the steering mechanism permits the direction of movement of two or more wheels to be changed by movement of a handle. These may comprise two wheels that are spaced either side of the second support tower, and/or may comprise two wheels that are spaced either side of the first support tower.

The mobile access unit may be made of any material provided that it is sufficiently light to be genuinely mobile. Preferably the mobile access unit is sufficiently light that it can be manually pushed into position. However, it is envisaged that the mobile access unit could be moved into position using motorised systems, such as a vehicle for towing or pushing the unit.

Suitable lightweight materials for use in the mobile access unit are, for example, materials comprising aluminium, including aluminium metal and aluminium based alloys such as Al—Zn, Al—Cu and Al—Li based alloys. Fibre-reinforced polymer composites could also be used, for example those based on an epoxy, vinyl ester or polyester thermosetting plastic reinforced with carbon fibre, fibreglass, or aramid fibres.

The unit may suitably also comprise strengthening materials, for example it may comprise iron or iron based alloys, such as steel and/or stainless steel, for achieving a desired strength level.

It may be that the continuous non-linear ramp is made from lightweight materials, such as aluminium metal and aluminium based alloys. It may be that the first support tower and/or the second support tower comprise lightweight materials, such as aluminium metal and aluminium based alloys, and/or strengthening materials, in particular iron or iron based alloys, such as steel. It may be that any additional support sections, which extend underneath some or all of the first moveable ramp section and/or some or all of the second moveable ramp section and/or some or all of the non-linear middle ramp section, are made from iron or iron based alloys, such as steel.

For example, the unit may have a steel chassis, as part of the support sections, which chassis may extend underneath some or all of the first moveable ramp section and/or some or all of the second moveable ramp section and/or some or all of the non-linear middle ramp section.

The unit may optionally comprise one or more flight of steps. The flight of steps may be a permanent part of the unit or may be removably securable to the unit.

The provision of a flight of steps can help increase efficiency of loading and unloading and reduce bottlenecks. Passengers who are able bodied and comfortable using steps can utilise the steps rather than needing to follow the entire length of the ramp.

Preferably, the flight of steps extends from a point on the non-linear middle ramp section and can, in use, extend down to the ground. The benefit of this arrangement is that during unloading it allows a constant flow of passengers from the aircraft onto the unit, without any delays caused by passengers deciding which way to go, as they must all move onto the first moveable ramp section via the aircraft entry/exit end. However, once the passengers are on the non-linear middle ramp section, those passengers that are sufficiently able bodied can choose to descend down the steps rather than follow the ramp around to the ground entry/exit end. This provides for a more efficient flow of passengers.

In one embodiment, the flight of steps is at a location on the continuous non-linear ramp closer to the aircraft entry/exit end than the ground entry/exit end.

In one embodiment, the flight of steps is at a location on the continuous non-linear ramp such that there is one or more bend in the continuous non-linear ramp between the aircraft entry/exit end and the flight of steps, for example two or more bends. It may be that the bends in the continuous non-linear ramp between the aircraft entry/exit end and the flight of steps have a total angle of 180 degrees or more.

In an alternative embodiment, the flight of steps is at a location on the continuous non-linear ramp such that there is no bend in the continuous non-linear ramp between the aircraft entry/exit end and the flight of steps.

It may be that the flight of steps is located at or near a bend that is formed at the join between the first moveable ramp section and the non-linear middle section.

In one embodiment, the direction of the flight of steps (from the top of the steps to the bottom) may be substantially perpendicular to the first moveable ramp section, i.e. they may be separated by substantially 90 degrees (e.g. 90 degrees±5 degrees, or 90 degrees±2 degrees, or 90 degrees±1 degree). The separation may be substantially 90 degrees clockwise or substantially 90 degrees anticlockwise. Alternatively, the direction of the flight of steps (from the top of the steps to the bottom) may be substantially parallel to, e.g. in line with, the first moveable ramp section.

In one embodiment, the entry to the flight of steps is substantially perpendicular to the first moveable ramp section, i.e. they may be separated by substantially 90 degrees (e.g. 90 degrees±5 degrees, or 90 degrees±2 degrees, or 90 degrees±1 degree). The separation may be substantially 90 degrees clockwise or substantially 90 degrees anticlockwise.

It may be that, when viewed by a passenger at the aircraft entry/exit end who is about to go down the ramp, the entry to the flight of steps is substantially perpendicular to the first moveable ramp section in a clockwise direction, i.e. the entry to the flight of steps is to the right. This is beneficial for safety reasons, in that it ensures the passengers using the steps move in a direction away from the aircraft engine.

Alternatively, the entry to the flight of steps may be substantially parallel to, e.g., in line with, the first moveable ramp section, but with the direction of the flight of steps, when viewed by a passenger at the aircraft entry/exit end who is about to go down the ramp, being substantially perpendicular to the first moveable ramp section; preferably in a clockwise direction, i.e. the direction of the flight of steps is to the right. This is beneficial for safety reasons, in that it ensures the passengers using the steps move in a direction away from the aircraft engine.

In one embodiment, the steps run alongside (parallel to) a portion of the ramp. Therefore the overall width of the unit is not significantly increased by the presence of the steps. This is advantageous in view of the restricted amount of space around an aircraft that is considered to be safe for passengers to occupy.

It may be that the direction of the flight of steps is substantially alongside a portion of the first moveable ramp section. In other words, direction of the flight of steps and a portion of the first moveable ramp section may be at an angle of five degrees or less to each other, e.g. two degrees or less, or one degree or less. This can be a beneficial arrangement in that it can result in the steps running alongside the ramp rather than extending outwardly therefrom. Therefore the overall width of the unit is not significantly increased by the presence of the steps. This is advantageous in view of the restricted amount of space around an aircraft that is considered to be safe for passengers to occupy.

In one embodiment, the flight of steps is fixed. However, in an alternative embodiment the flight of steps is removable or is foldable into or under the unit.

The unit is suitably provided with handrails. Preferably handrails are provided along most or all of the first moveable ramp section, the second moveable ramp section and the non-linear middle ramp section. In one embodiment, handrails run along both sides of most (e.g. 90% or more of the length) or all of the length of the continuous non-linear ramp extending from the aircraft loading door to the ground.

The unit may optionally be provided with a chute. The chute may in particular be a rubbish chute. The chute may extend from an entry end to an exit end. The entry end of the chute may suitably be at a location on the first moveable ramp section, preferably at the aircraft entry/exit end. The exit end of the chute may suitably be at an exit location, such as at or near the ground. In one embodiment, the chute may extend downwardly from a location on the first moveable ramp section, preferably at the aircraft entry/exit end, to an exit location that in use is at or near to the ground. The benefit of such a chute is that products, in particular rubbish, can be dropped down the chute rather than needing to be carried off the aircraft. For example, the exit end of the chute may be placed in a container for collecting rubbish, and any rubbish may be collected from the aircraft and deposited into the entry end. This improves safety for members of staff by avoiding the need for them to carry off bags of rubbish manually.

DESCRIPTION OF THE DRAWINGS

The invention will now be further described, by means of example only, with reference to the drawings in which.

Figure 1:
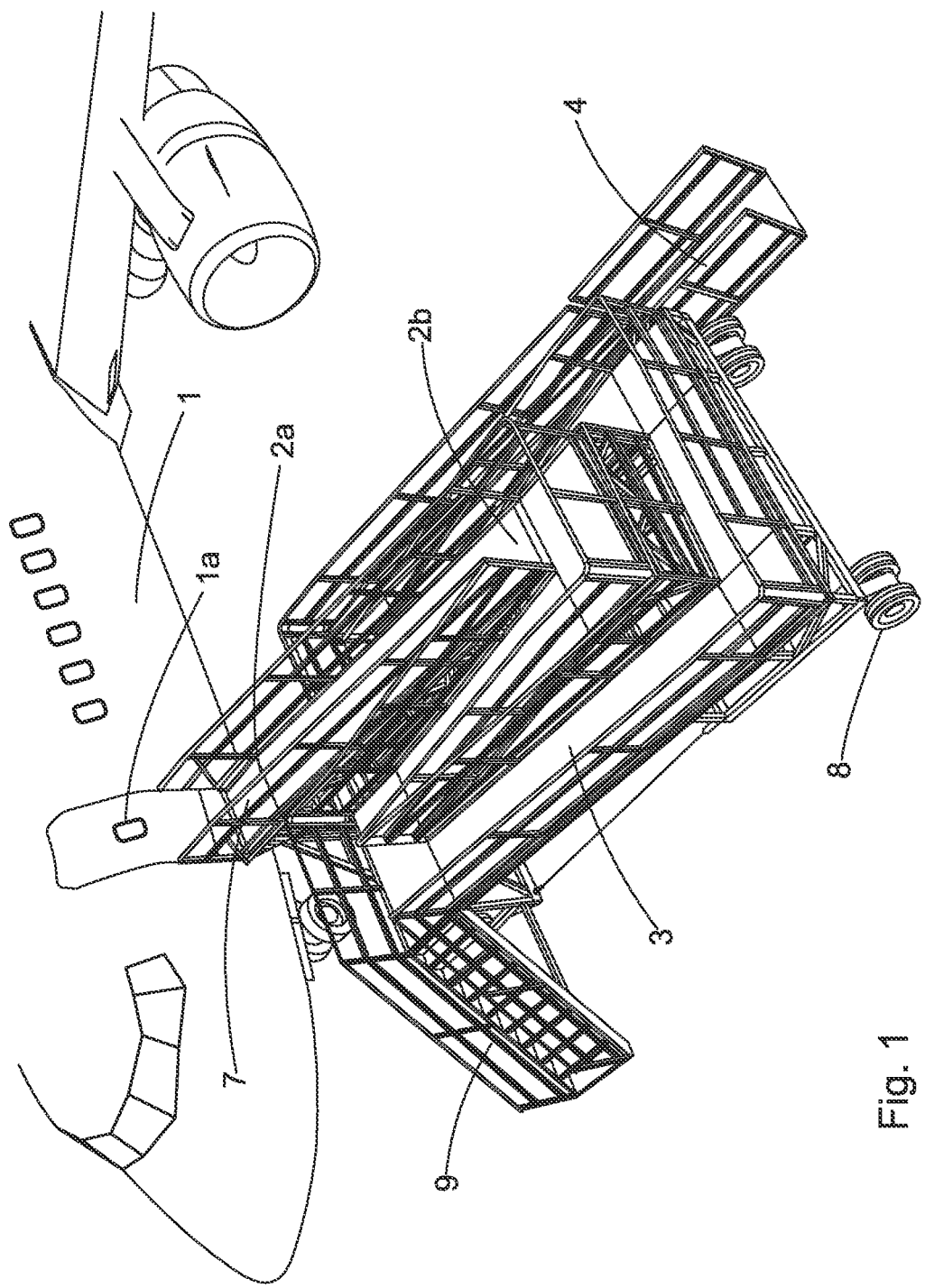
FIG. 1 is a perspective view of a unit in accordance with the invention, showing the unit in use with an aircraft, in a configuration where the first moveable ramp section is raised and the second moveable ramp section is lowered.

The unit shown in the figures is a mobile access unit for allowing passengers to embark or disembark from an aircraft 1.

The unit has a first moveable ramp section 2 that is a linear ramp. This extends from an aircraft entry/exit end 2a, which allows access to the aircraft loading door 1a, to a hinged end 2b. The aircraft entry/exit end 2a can rotate about the hinged end 2b, between a raised position and a lowered position. In use, the raised position is at an angle (such as from 4 to 6 degrees, e.g. 5.3 degrees) above the horizontal and the lowered position of the aircraft entry/exit end is at angle (such as from 4 to 6 degrees, e.g. 5.3 degrees) below the horizontal.

The rotation of the aircraft entry/exit end 2a allows adjustment to match the height of the aircraft loading door in relation to the ground. The raised position and the lowered position are suitably about a meter or more apart, so as to cover the range of heights of aircraft loading doors, in relation to the ground, found in different sizes of aircraft. For smaller aircraft, the aircraft entry/exit end 2a will be at or near the lowered position, at angle below the horizontal, whilst for larger aircraft the aircraft entry/exit end 2a will be at or near the raised position, at angle above the horizontal.

The unit is provided with a platform 7 that extends from the aircraft entry/exit end 2a. The platform 7 is the only portion of the unit that actually contacts the aircraft 1 in use, therefore minimising the chance of damage to the aircraft. The platform 7 can be moved telescopically between a non-engaging position and an engaging position, where the platform contacts the aircraft. All areas of the platform that contact the aircraft are made from a soft material such as rubber or foam.

The unit has a non-linear middle ramp section 3, extending from a first linking end 3a to a second linking end 3b.

The unit also has a second moveable ramp section 4 that is a linear ramp. This extends from a hinged end 4a to a ground entry/exit end 4b, which allows access to the ground. The ground entry/exit end 4b can rotate about the hinged end 4a, between a raised position and a lowered position, therefore allowing movement of the second moveable ramp section from a position where it is raised off the ground, to a lowered position where it contacts the ground.

The first linking end 3a of the non-linear middle ramp section 3 links with the hinged end 2b of the first moveable ramp section 2. The second linking end 3b of the non-linear middle ramp section 3 links with the hinged end 4a of the second moveable ramp section 4. The first moveable ramp section 2, middle ramp section 3 and second moveable ramp section 4 together form a continuous non-linear ramp extending from the aircraft loading door 1a to the ground.

The ground entry/exit end 4b is rotated about the hinged end 4a, between a raised position and a lowered position, by being manually lifted or lowered. The raised position is suitably a position that, in use, is vertical. The lowered position is suitably a position that, in use, is about 4 to 6 degrees to the ground, e.g. 5.3 degrees to the ground.

The ground entry/exit end 4b may be moved into its raised position to aid transportation of the unit to and from the aircraft. When the unit is in position at the aircraft, the ground entry/exit end 4b may be moved into its lowered position, so that it touches the ground and therefore provides access for passengers, including those in wheelchairs, between the continuous non-linear ramp and the ground.

The continuous non-linear ramp includes a total of five turns 11a-e. All of the turns are 90 degree turns or 180 degree turns. The sum of the angles turned by the continuous non-linear ramp over its length is 720 degrees, i.e. two complete turns. This means that the direction of travel of a passenger at the aircraft entry/exit end 2a is the same as the direction of travel of the passenger at the ground entry/exit end 4b.

The non-linear middle section 3 joins the first moveable ramp section 2 at an angle of 90 degrees to the direction of travel. Further, the non-linear middle section 3 has a 90 degree turn, at or near its first linking end 3a. This creates a combined degree of turn of 180 degrees. This is the first turn 11a in the continuous non-linear ramp.

The non-linear middle section 3 then has four turns 11b-e. These are a 180 degree turn 11b, followed by a 90 degree turn 11c, followed by a 90 degree turn 11d, followed by a 180 degree turn 11e.

The turns 11a-e in the continuous non-linear ramp alternate between right handed turns and left handed turns.

The second moveable ramp section 4 joins the non-linear middle section 3 (with the second linking end 3b linking with the hinged end 4a of the second moveable ramp section) in the direction of travel, such that this join is linear rather than a turn being created at this join.

The non-linear middle section 3 has a fixed angle of inclination which is preferably about 4 to 6 degrees, e.g. 5.3 degrees.

The unit also includes a first support tower 5 that bears load from at least the non-linear middle ramp section 3, and a second support tower 6 that bears load from at least the first moveable ramp section 2.

The first support tower 5 extends from the first linking end 3a of the non-linear middle ramp section and the hinged end 2b of the first moveable ramp section down to ground level.

The second support tower 6 extends from the aircraft entry/exit end 2a of the first moveable ramp section down to ground level.

The second support tower 6 is height adjustable, by a winch and pulley system. Adjustment of the height of this tower moves the aircraft entry/exit end 2a between its raised position and its lowered position. In other words, adjustment of the height of the second support tower 6 alters the angle of inclination of the first moveable ramp section 2.

The unit has four wheels 8 to allow ready movement of the unit into position for use. There are two wheels spaced either side of the first support tower 5 and two wheels spaced either side of the second support tower 6.

Figure 2:
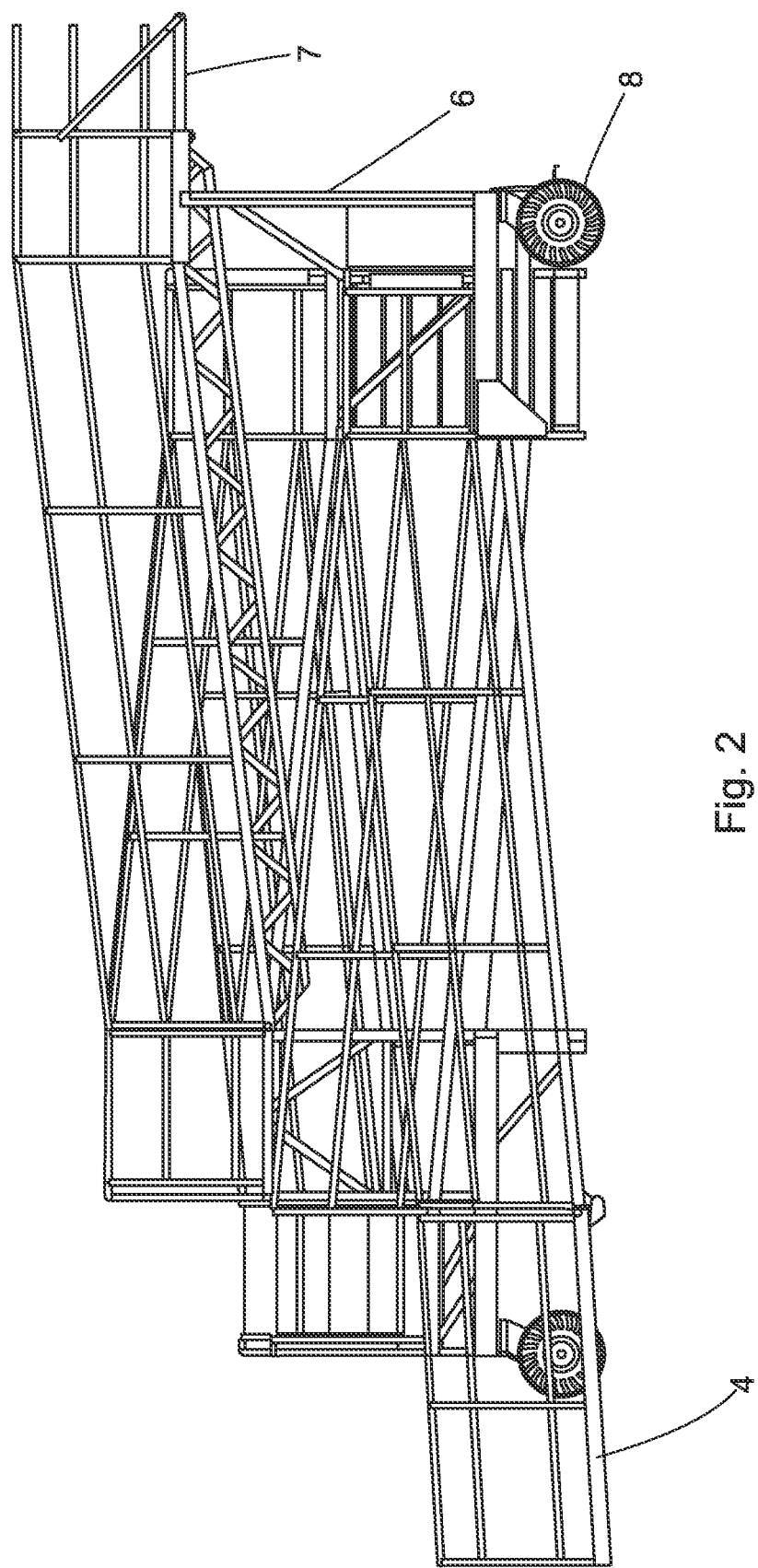
FIG. 2 is a side view of the unit of FIG. 1, in a configuration where the first moveable ramp section is raised and the second moveable ramp section is lowered.
Figure 3:
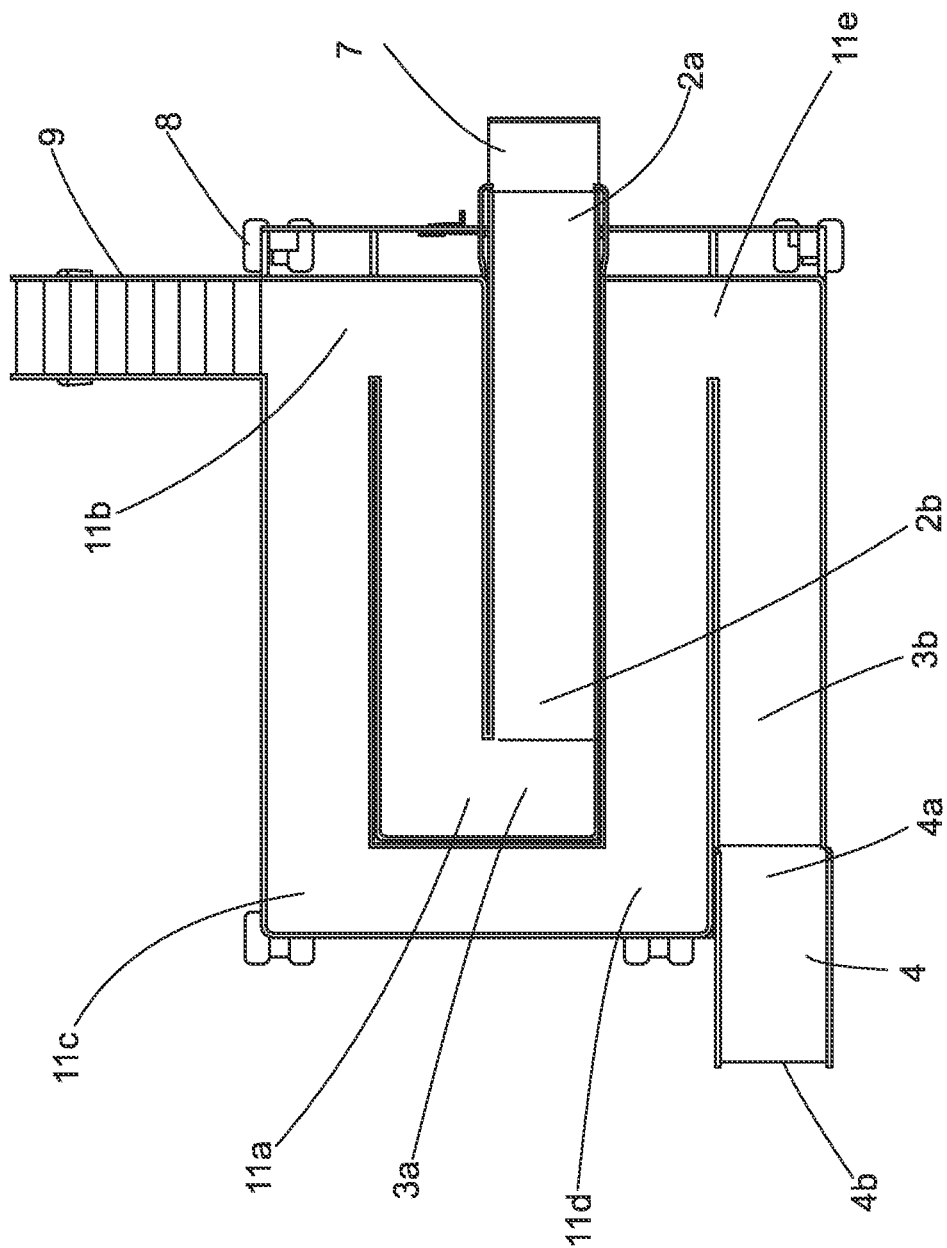
FIG. 3 is a plan view from above of the unit of FIG. 1.
Figure 4:
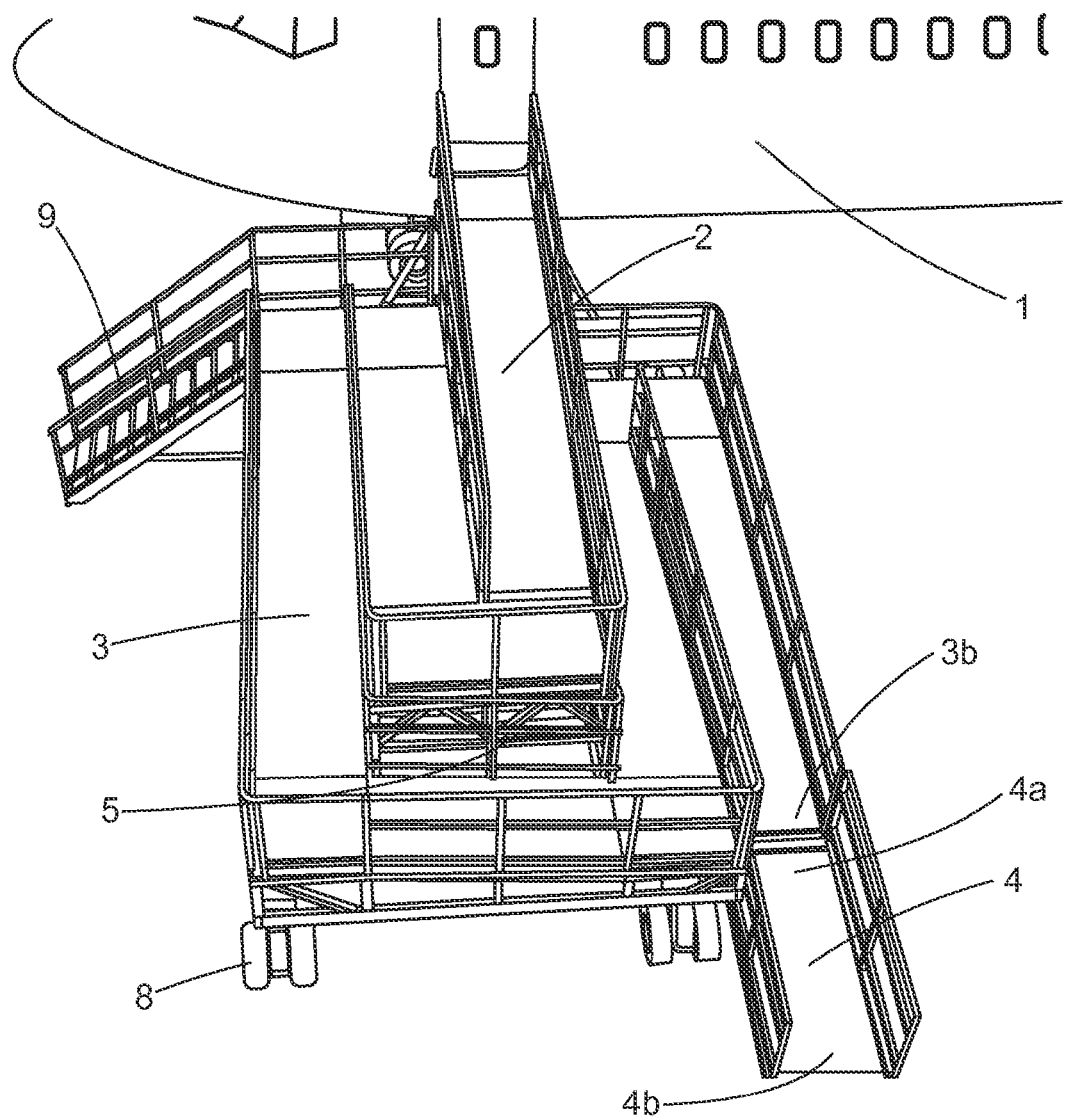
FIG. 4 is a perspective view from one end showing the unit of FIG. 1 in use with an aircraft, in a configuration where the first moveable ramp section is raised and the second moveable ramp section is lowered.
Figure 5:
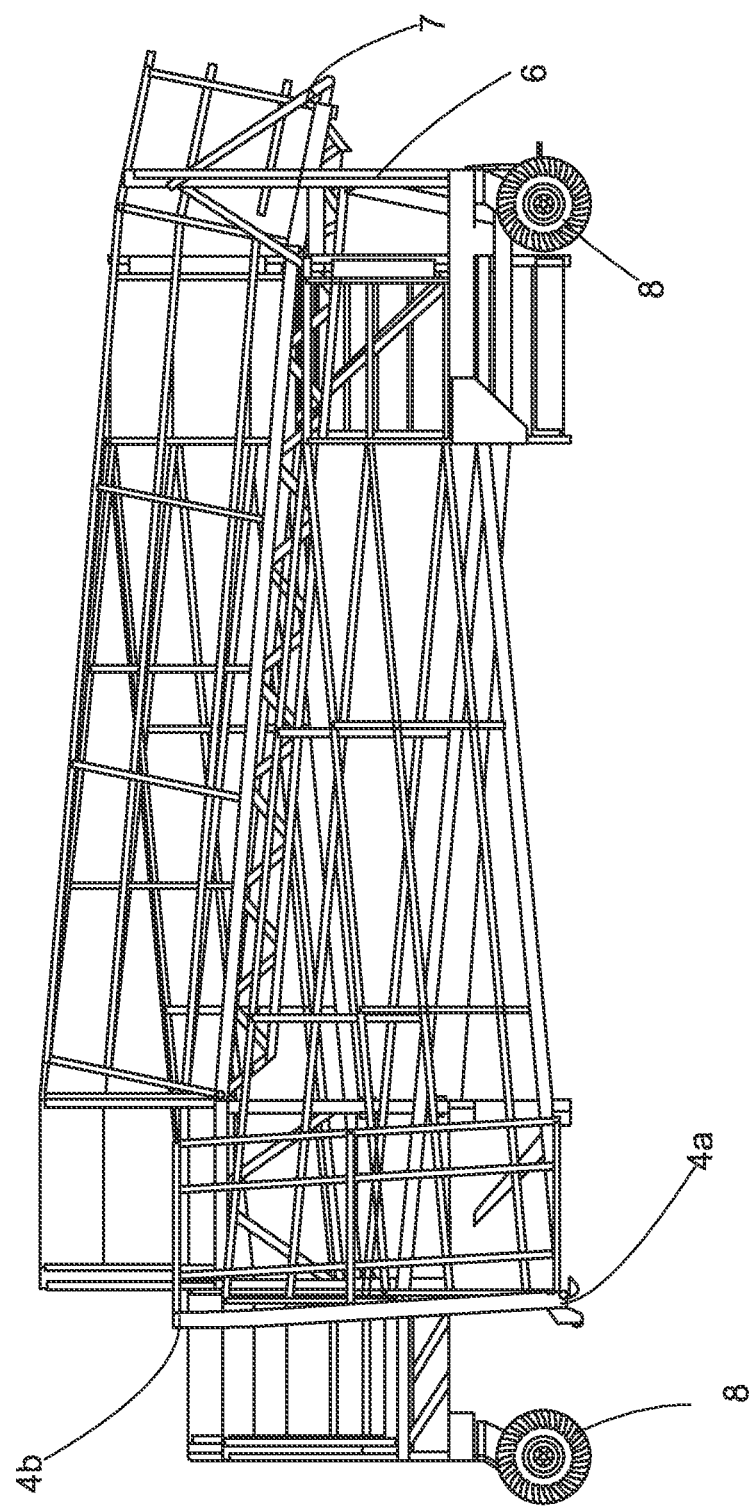
FIG. 5 is a side view of the unit of FIG. 1, in a folded configuration suitable for transportation, where the first moveable ramp section is lowered and the second moveable ramp section is raised.
Figure 6:
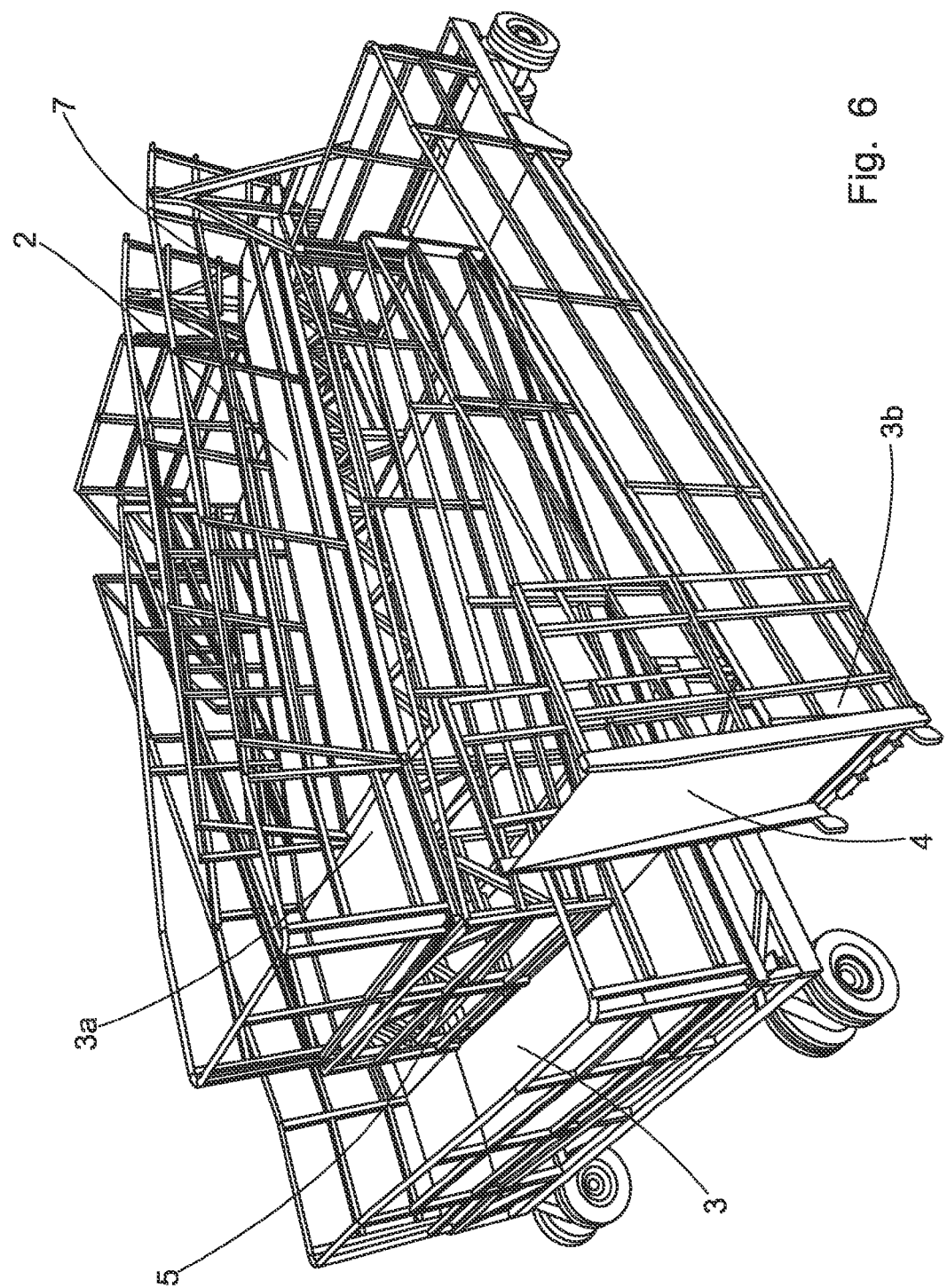
FIG. 6 is a perspective view of the unit of FIG. 1 in a folded configuration suitable for transportation, where the first moveable ramp section is lowered and the second moveable ramp section is raised.
Figure 7:
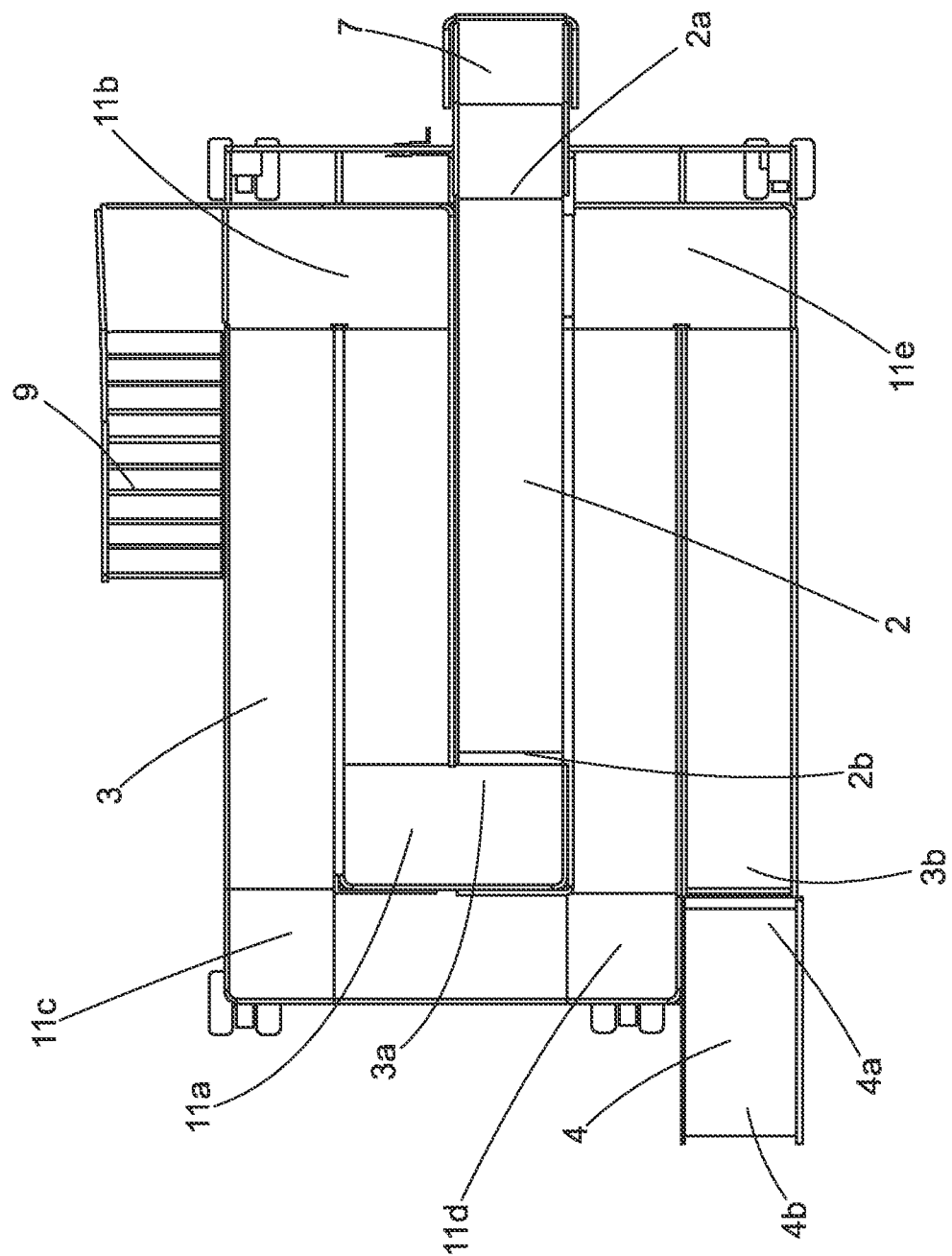
FIG. 7 is a plan view from above of a first alternative unit in accordance with the invention, which has steps running alongside the ramp rather than extending outwardly therefrom.
Figure 8:
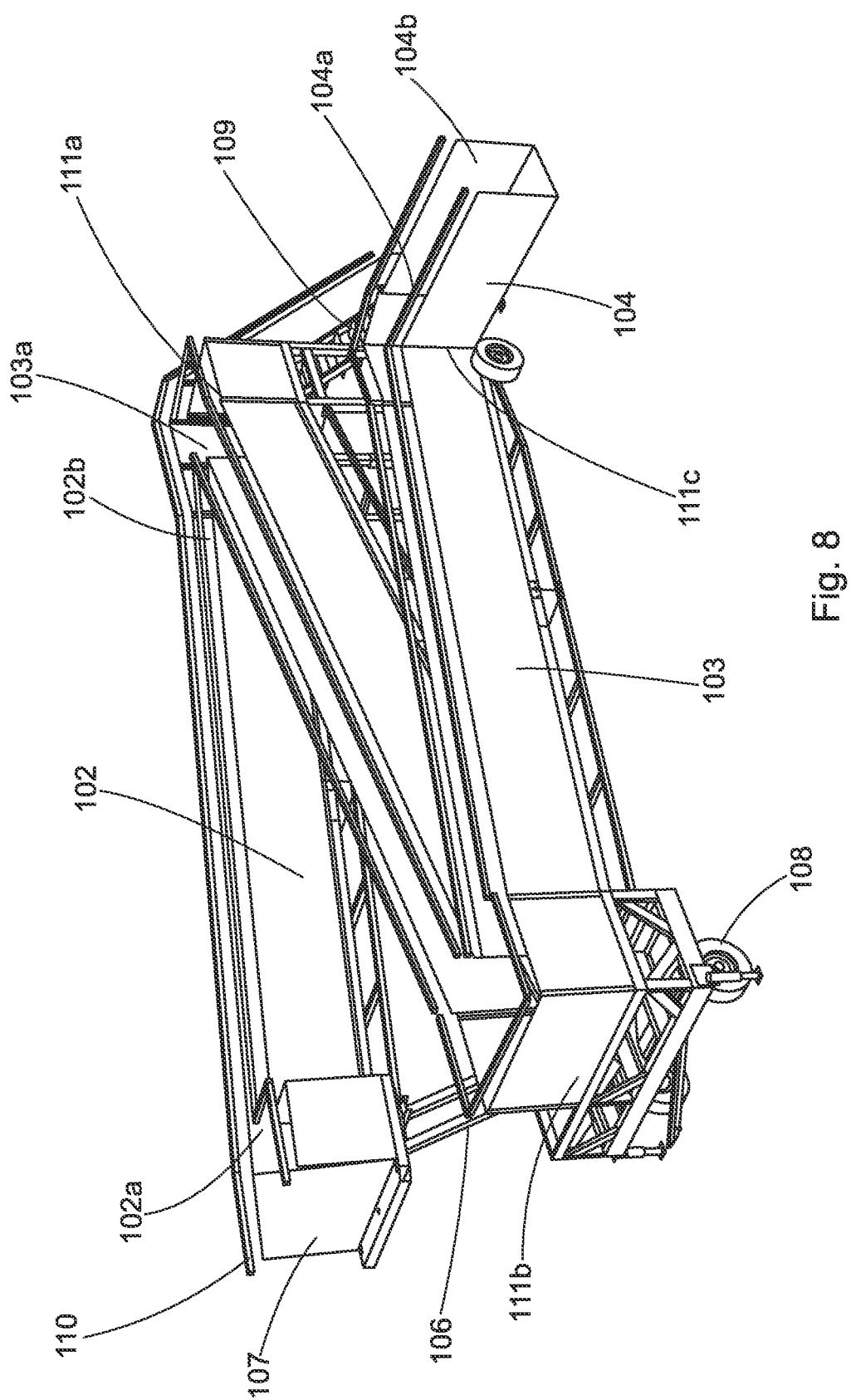
FIG. 8 is a perspective view of a second alternative unit in accordance with the invention.
Figure 9:
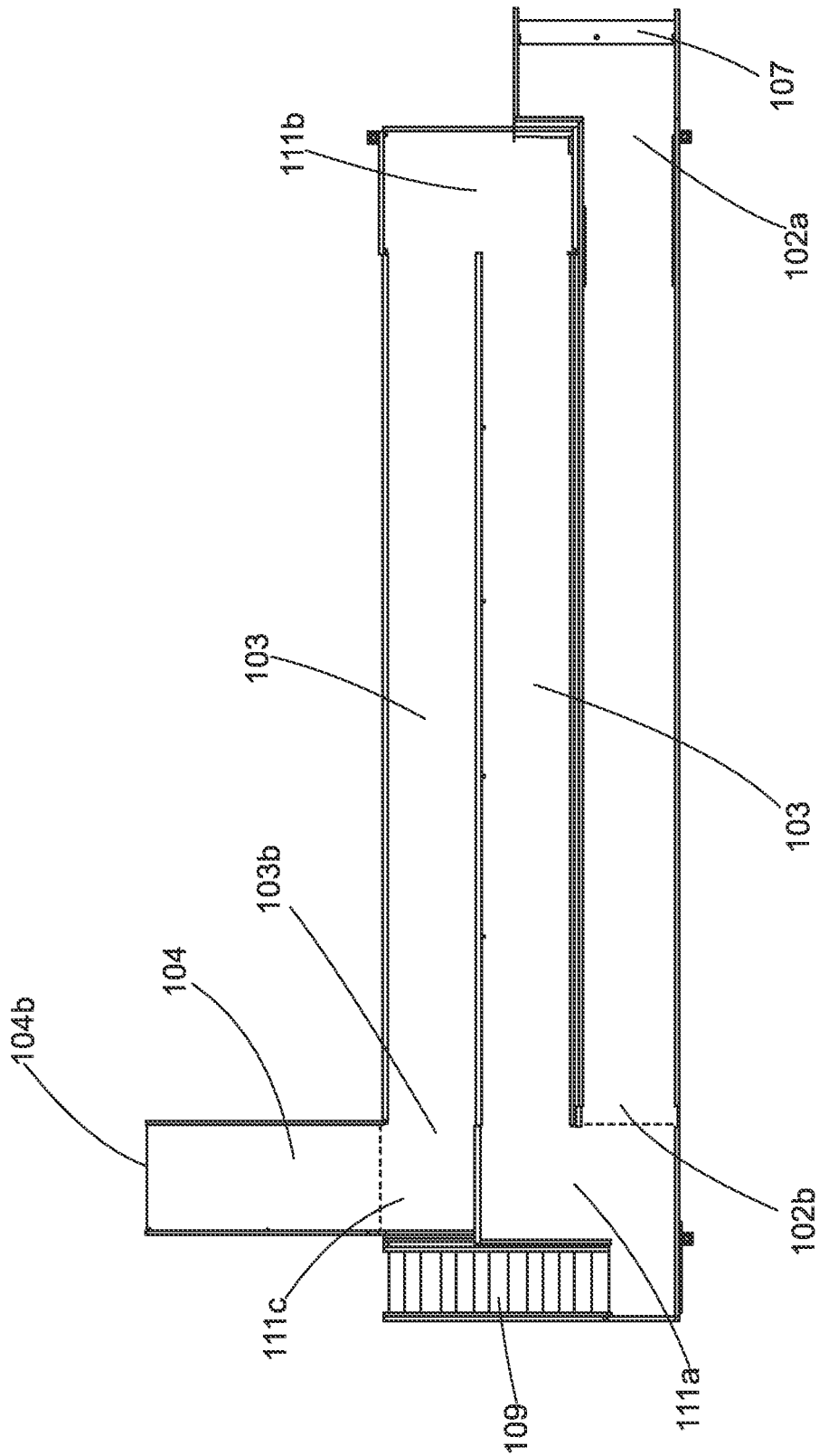
FIG. 9 is a plan view from above of the unit of FIG. 8.
Figure 10:
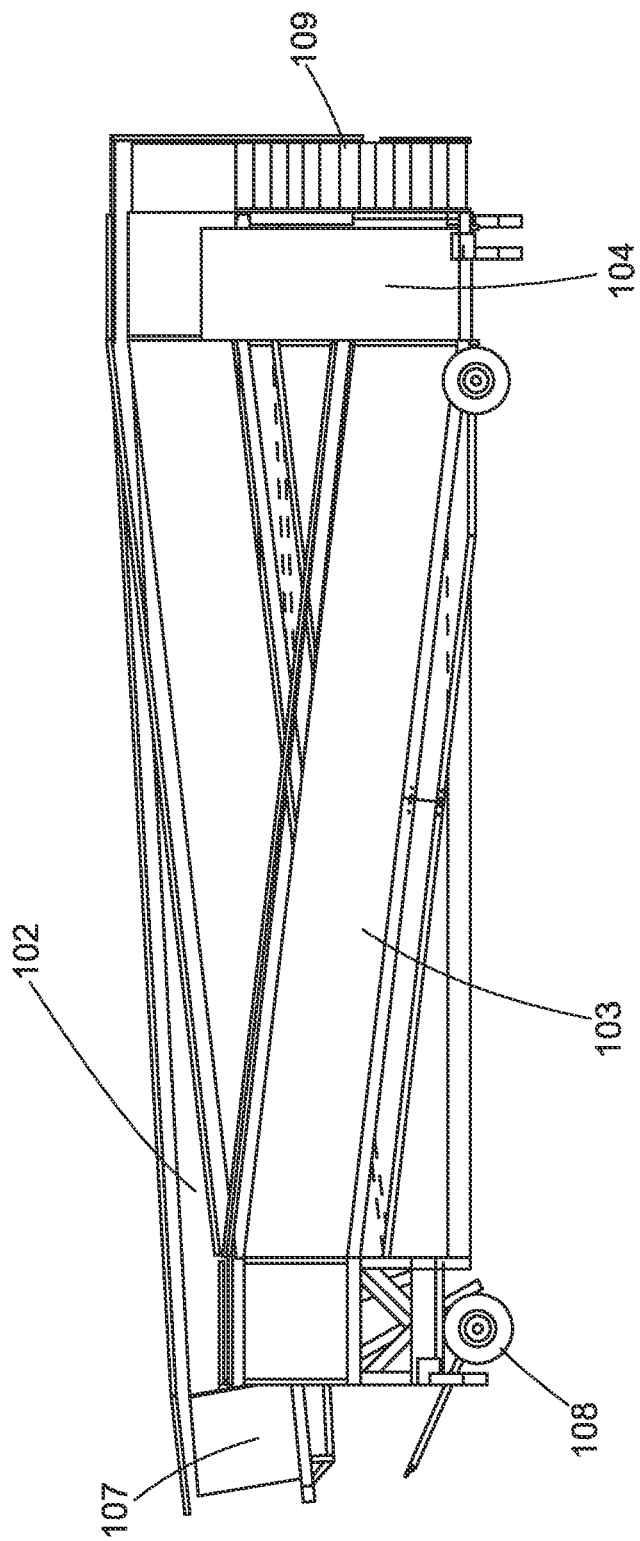
FIG. 10 is a side view of the unit of FIG. 8, as viewed from the airport terminal side, in a folded configuration suitable for transportation, where the first moveable ramp section is lowered and the second moveable ramp section is raised.
Figure 11:
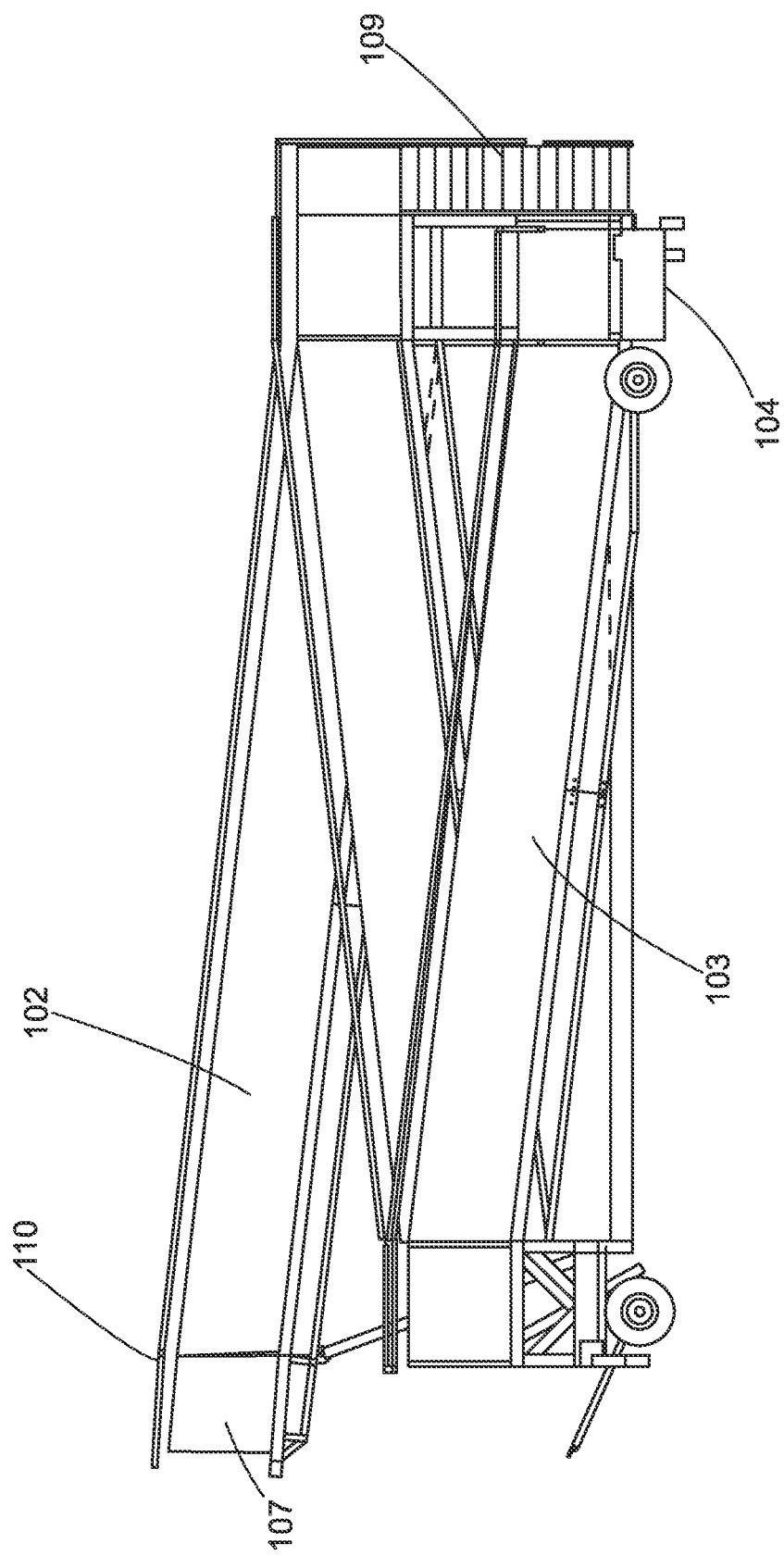
FIG. 11 is a side view of the unit of FIG. 8, as viewed from the airport terminal side, in a configuration where the first moveable ramp section is raised and the second moveable ramp section is lowered.
Figure 12:
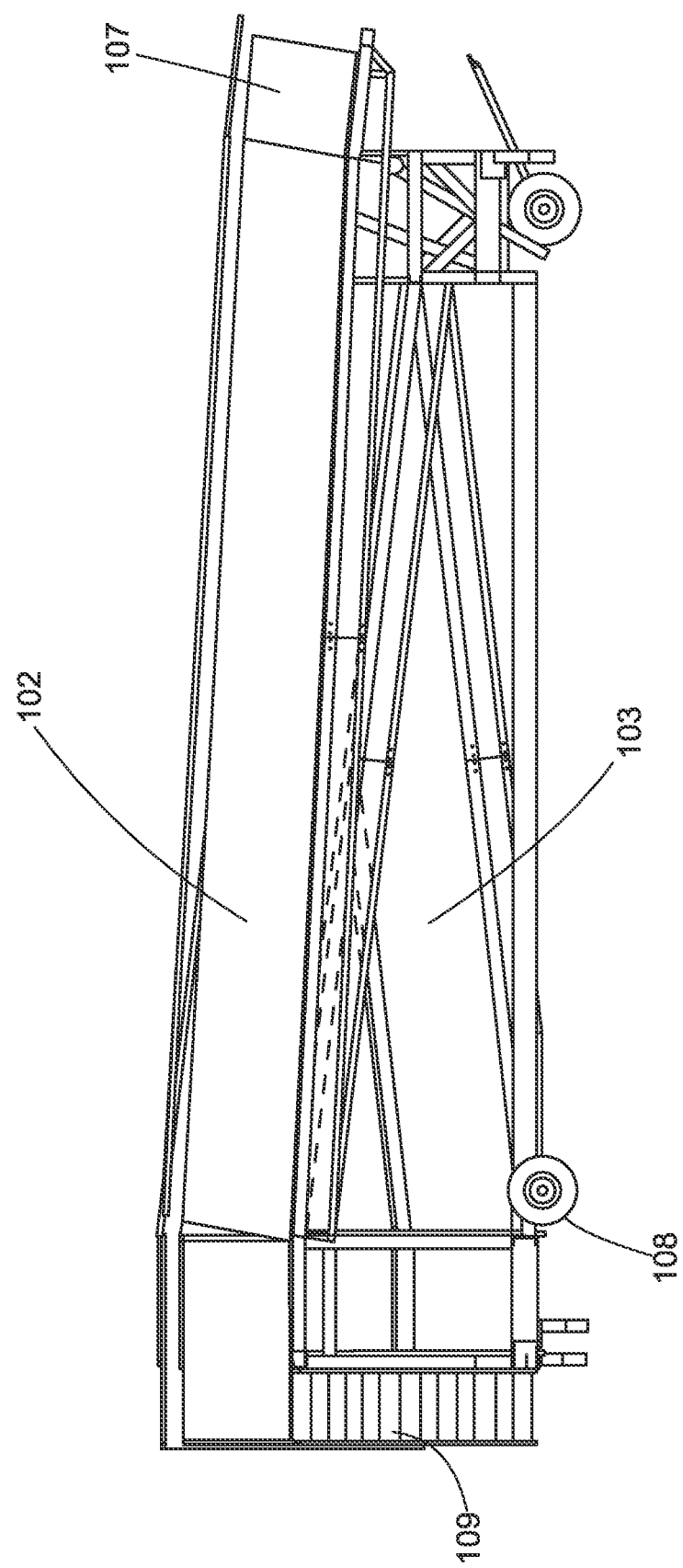
FIG. 12 is a side view of the unit of FIG. 8, as viewed from the aircraft wing side, in a folded configuration suitable for transportation, where the first moveable ramp section is lowered and the second moveable ramp section is raised.
Figure 13:
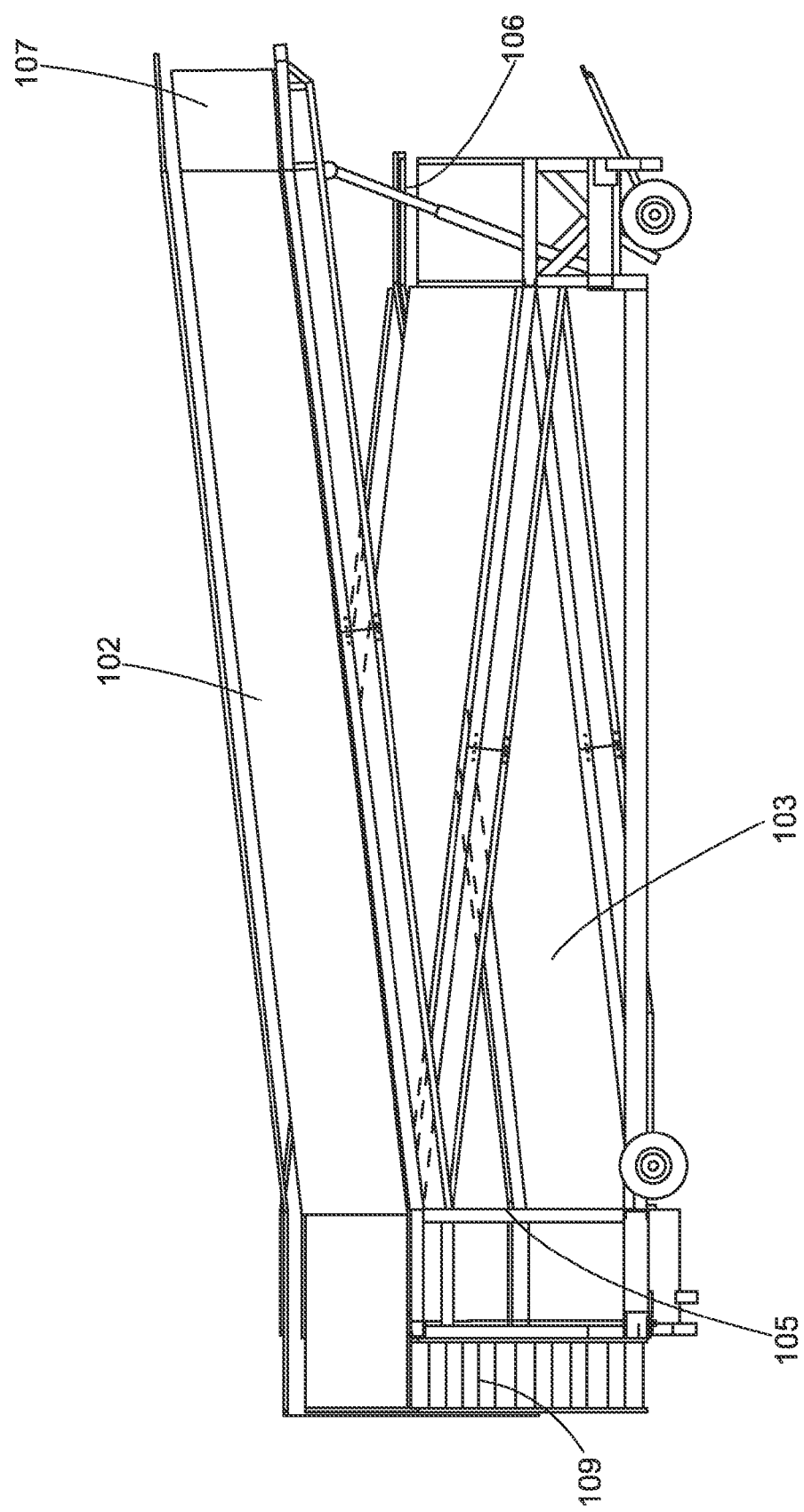
FIG. 13 is a side view of the unit of FIG. 8, as viewed from the aircraft wing side, in a configuration where the first moveable ramp section is raised and the second moveable ramp section is lowered.

The unit also has a flight of steps 9. The flight of steps 9 extends from the non-linear middle ramp section 3 down to the ground. The entry to the steps is perpendicular to the first moveable ramp section 2. The flight of steps may be in a direction that is perpendicular to the first moveable ramp section 2, as shown in FIG. 2, or may be in a direction that is parallel to the first moveable ramp section, as shown in FIG. 7.

The flight of steps 9 is at a location on the continuous non-linear ramp closer to the aircraft entry/exit end 2a than the ground entry/exit end 4b. There are two 180 degree bends 11a,b in the continuous non-linear ramp between the aircraft entry/exit end 2a and the flight of steps 9.

The location of the flight of steps 9 allows a constant flow of passengers during unloading from the aircraft 1, without any delays caused by passengers deciding which way to go, as they must all move onto the first moveable ramp section 2 via the aircraft entry/exit end 2a. However, once the passengers are on the non-linear middle ramp section 3, those passengers that are sufficiently able bodied can chose to descend down the steps 9 rather than follow the ramp around to the ground entry/exit end 4b. This provides for a more efficient flow of passengers.

The unit is provided with handrails 10 for safety.

An alternative design for the unit is shown in FIGS. 8 to 13.

This unit has a first moveable ramp section 102 that is a linear ramp. This extends from an aircraft entry/exit end 102a, which allows access to the aircraft loading door 1a, to a hinged end 102b. The aircraft entry/exit end 102a can rotate about the hinged end 102b, between a raised position and a lowered position. In use, the raised position is at an angle (such as from 5 to 8 degrees, e.g. 5.7 degrees) above the horizontal and the lowered position of the aircraft entry/exit end is at angle (such as from 5 to 8 degrees, e.g. 5.7 degrees) below the horizontal.

The rotation of the aircraft entry/exit end 102a allows adjustment to match the height of the aircraft loading door in relation to the ground. The raised position and the lowered position are suitably about a meter or more apart, so as to cover the range of heights of aircraft loading doors, in relation to the ground, found in different sizes of aircraft. For smaller aircraft, the aircraft entry/exit end 102a will be at or near the lowered position, at angle below the horizontal, whilst for larger aircraft the aircraft entry/exit end 102a will be at or near the raised position, at angle above the horizontal.

The unit is provided with a platform 107 that extends from the aircraft entry/exit end 102a. The platform 107 is the only portion of the unit that actually contacts the aircraft in use, therefore minimising the chance of damage to the aircraft. The platform 107 can be moved between a non-engaging position and an engaging position, where the platform contacts the aircraft. All areas of the platform that contact the aircraft are made from a soft material such as rubber or foam.

The unit has a non-linear middle ramp section 103, extending from a first linking end 103a to a second linking end 103b.

The unit also has a second moveable ramp section 104 that is a linear ramp. This extends from a hinged end 104a to a ground entry/exit end 104b, which allows access to the ground. The ground entry/exit end 104b can rotate about the hinged end 104a, between a raised position and a lowered position, therefore allowing movement of the second moveable ramp section from a position where it is raised off the ground, to a lowered position where it contacts the ground.

The first linking end 103a of the non-linear middle ramp section 103 links with the hinged end 102b of the first moveable ramp section 102. The second linking end 103b of the non-linear middle ramp section 103 links with the hinged end 104a of the second moveable ramp section 104. The first moveable ramp section 102, middle ramp section 103 and second moveable ramp section 104 together form a continuous non-linear ramp extending from the aircraft loading door to the ground.

The ground entry/exit end 104b is rotated about the hinged end 104a, between a raised position and a lowered position, by being manually lifted or lowered. The raised position is suitably a position that, in use, is vertical. The lowered position is suitably a position that, in use, is about 5 to 8 degrees, to the ground, e.g. 5.7 degrees to the ground.

The ground entry/exit end 104b may be moved into its raised position to aid transportation of the unit to and from the aircraft. When the unit is in position at the aircraft, the ground entry/exit end 104b may be moved into its lowered position, so that it touches the ground and therefore provides access for passengers, including those in wheelchairs, between the continuous non-linear ramp and the ground.

The continuous non-linear ramp includes a total of three turns 11a-c. All of the turns are 90 degree turns or 180 degree turns. The sum of the angles turned by the continuous non-linear ramp over its length is 450 degrees, i.e. one and a quarter turns. This means that the direction of travel of a passenger at the ground entry/exit end 104b is 90 degrees to the direction of travel of the passenger at the aircraft entry/exit end 102a.

The non-linear middle section 103 joins the first moveable ramp section 102 at an angle of 90 degrees to the direction of travel. Further, the non-linear middle section 103 has a 90 degree turn, at or near its first linking end 103a. This creates a combined degree of turn of 180 degrees. This is the first turn 111a in the continuous non-linear ramp.

The non-linear middle section 103 then has one 180 degree turn 111b.

Finally, the second moveable ramp section 104 joins the non-linear middle section 103 (with the second linking end 103b linking with the hinged end 104a of the second moveable ramp section) at 90 degrees, such that the combined degree of turn at this join is 90 degrees. This provides the final turn 111*c*.

The turns 111*a-c* in the continuous non-linear ramp alternate between right handed turns and left handed turns.

The non-linear middle section 103 has a fixed angle of inclination which is preferably about 5 to 8 degrees, e.g. 5.7 degrees.

The unit also includes a first support tower 105 that bears load from at least the non-linear middle ramp section 103, and a second support tower 106 that bears load from at least the first moveable ramp section 102.

The first support tower 105 extends from the first linking end 103*a* of the non-linear middle ramp section and the hinged end 102*b* of the first moveable ramp section down to ground level.

The second support tower 106 extends from the aircraft entry/exit end 102*a* of the first moveable ramp section down to ground level.

The second support tower 106 is height adjustable, by a winch and pulley system. Adjustment of the height of this tower moves the aircraft entry/exit end 102*a* between its raised position and its lowered position. In other words, adjustment of the height of the second support tower 106 alters the angle of inclination of the first moveable ramp section 102.

The unit has four wheels 108 to allow ready movement of the unit into position for use. There are two wheels spaced either side of the first support tower 105 and two wheels spaced either side of the second support tower 106.

The unit also has a flight of steps 109. The flight of steps 109 extends from the join between the non-linear middle ramp section 103 and the first moveable ramp section 102, i.e. it is located at the first turn 111*a*. The flight of steps extends down to the ground. The entry to the steps is in line with the first moveable ramp section 102. The flight of steps extends in a direction that is perpendicular to the first moveable ramp section 102. This results in the steps running alongside the unit, adjacent to the first turn 111*a* and the second moveable ramp section 104.

The location of the flight of steps 109 at the join between the non-linear middle ramp section 103 and the first moveable ramp section 102 allows a constant flow of passengers during unloading from the aircraft, without any delays caused by passengers deciding which way to go, as they must all move onto the first moveable ramp section 102 via the aircraft entry/exit end 102*a*. However, once the passengers reach the non-linear middle ramp section 103, those passengers that are sufficiently able bodied can chose to descend down the steps 109 rather than follow the ramp around to the ground entry/exit end 104*b*. This provides for a more efficient flow of passengers.

The unit is provided with handrails 110 for safety.

Figure 14:
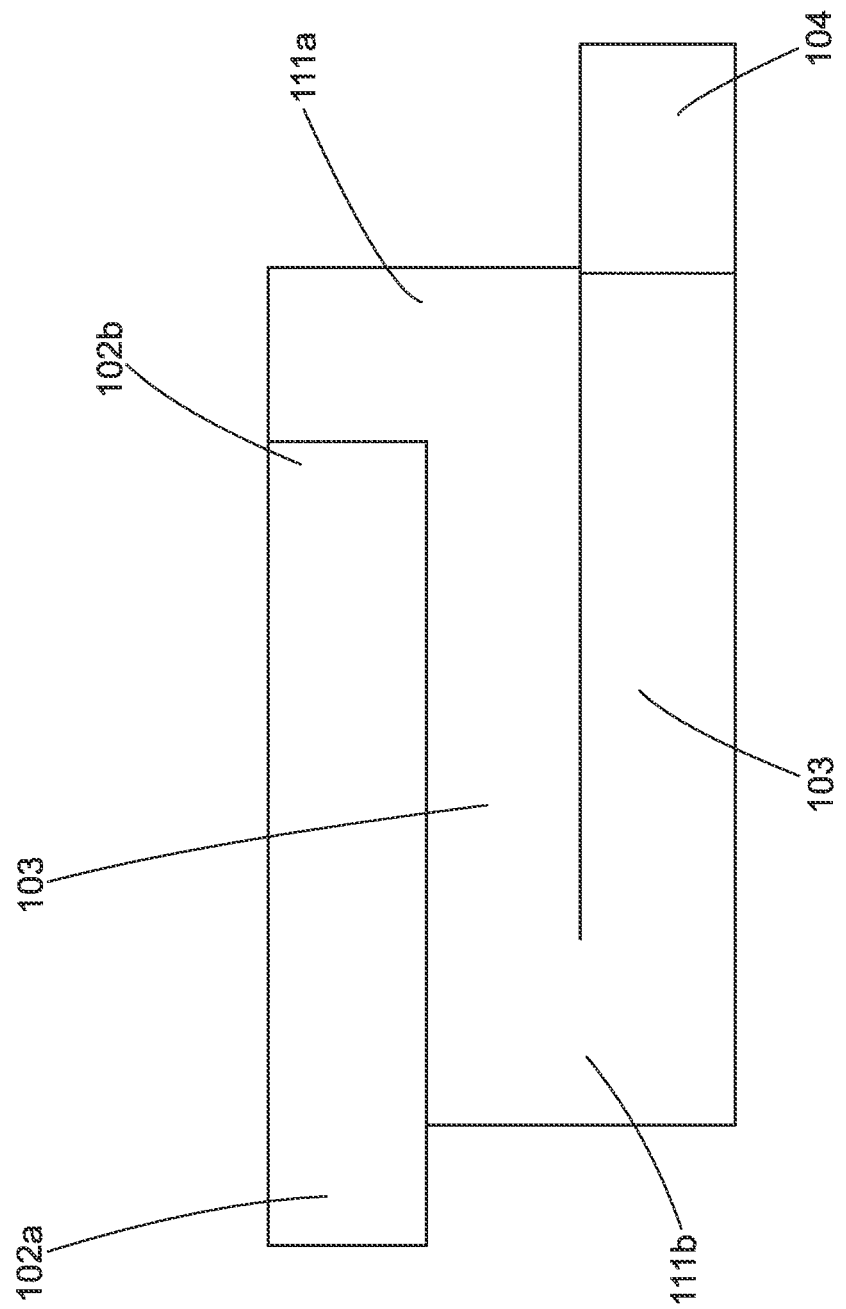
FIG. 14 is a plan view from above showing an alternative configuration for the unit.

A possible variation in this design for the unit is shown in FIG. 14.

In this variation, the continuous non-linear ramp includes a total of two turns 111*a-b*. All of the turns are 90 degree turns or 180 degree turns. The sum of the angles turned by the continuous non-linear ramp over its length is 360 degrees, i.e. one complete turn. This means that the direction of travel of a passenger at the ground entry/exit end 104*b* is the same as the direction of travel of the passenger at the aircraft entry/exit end 102*a*.

The non-linear middle section 103 joins the first moveable ramp section 102 at an angle of 90 degrees to the direction of travel. Further, the non-linear middle section 103 has a 90 degree turn, at or near its first linking end 103*a*. This creates a combined degree of turn of 180 degrees. This is the first turn 111*a* in the continuous non-linear ramp.

The non-linear middle section 103 then has one 180 degree turn 111*b*.

The second moveable ramp section 104 joins the non-linear middle section 103 (with the second linking end 103*b* linking with the hinged end 104*a* of the second moveable ramp section) linearly.

The turns 111*a-b* in the continuous non-linear ramp alternate between right handed turns and left handed turns.

Apart from these differences, the unit may be the same as described above.

Any design of the unit may optionally be provided with a chute (not shown). The chute may in particular be a rubbish chute. The chute may extend from an entry end, preferably located at the aircraft entry/exit end, to an exit end, which may suitably be located at or near the ground. The benefit of such a chute is that products, in particular rubbish, can be dropped down the chute rather than needing to be carried off the aircraft.

Any design of the unit may generally be made from lightweight materials. The continuous ramp may be made from lightweight materials such as aluminium metal and aluminium based alloys. The support towers may comprise lightweight materials, such as aluminium metal and aluminium based alloys, and/or strengthening materials, in particular iron or iron based alloys, such as steel. Any additional support sections, may be made from iron or iron based alloys, such as steel. For example, the unit may have a steel chassis, as part of the support sections, which chassis may extend underneath some or all of the first moveable ramp section and/or some or all of the second moveable ramp section and/or some or all of the non-linear middle ramp section.

It will be understood that passengers boarding the aircraft 1 may enter onto the continuous non-linear ramp at the ground entry/exit end 4*b*/104*b* and follow the ramp along sections 4/104, 3/103 and 2/102 to reach aircraft entry/exit end 2*a*/102*a*. They can then cross the platform 7/107 to enter the aircraft via the aircraft loading door 1*a*. Sufficiently able-bodied passengers may chose to walk up the steps 9/109 to enter onto the ramp at a higher point, and then walk along the remainder of the continuous non-linear ramp to reach aircraft entry/exit end 2*a*/102*a*. They can then cross the platform 7/107 to enter the aircraft via the aircraft loading door 1*a*.

Equally, passengers leaving the aircraft 1 may enter onto the continuous non-linear ramp via the platform 7/107 to reach the aircraft entry/exit end 2*a*/102*a*. They can then follow the ramp along sections 2/102, 3/103 and 4/104 to reach ground entry/exit end 4*b*/104*b* and transfer onto the ground. Sufficiently able-bodied passengers may chose to walk down the steps 9/109 when they reach them, to transfer to the ground more quickly.

The invention claimed is:

1. A mobile access unit for allowing fully mobile, less mobile, and disabled passengers to embark or disembark from a craft, such as an aircraft, the unit comprising:
    a first moveable ramp section, extending from a craft entry/exit end, which allows access to the loading door of the craft, to a hinged end, wherein the entry/exit end can rotate about the hinged end, between a raised position and a lowered position;
    a second moveable ramp section, extending from a hinged end to a ground entry/exit end, which allows access to the ground, wherein the ground entry/exit end can rotate about the hinged end, between a raised position and a lowered position; and a non-linear middle ramp section, extending from a first linking end, which links with the hinged end of the first moveable ramp section, to a second linking end, which links with the hinged end of the second moveable ramp section;

wherein the first moveable ramp section, middle ramp section and second moveable ramp section can together form a continuous non-linear ramp that can extend from the loading door of the craft to the ground, wherein the continuous non-linear ramp includes two or more turns and wherein the sum of the angles turned by the continuous non-linear ramp over its length is 360 degrees or more, and wherein the nonlinear middle section comprises an inclined ramp that has a fixed angle of inclination, and wherein the unit permits the passengers to embark or disembark from the craft without needing to walk up or down a staircase.

2. The unit of claim 1 wherein the continuous non-linear ramp extending from the entry/exit end to the ground entry/exit end includes three or more turns.

3. The unit of claim 1 wherein the sum of the angles turned by the continuous non-linear ramp over its length is 450 degrees or more.

4. The unit of claim 1 wherein the continuous non-linear ramp only includes turns that are selected from 90 degree turns and 180 degree turns.

5. The unit of claim 1 wherein the continuous non-linear ramp includes two or more turns that are 180 degree turns.

6. The unit of claim 1 wherein the turns in the continuous non-linear ramp alternate between right handed turns and left handed turns or alternate between left handed turns and right handed turns.

7. The unit of claim 1 wherein there is one or more 180 degree turn in the non-linear middle section.

8. The unit of claim 1 wherein the non-linear middle section is a ramp having an angle of inclination of 10 degrees or less.

9. The unit of claim 8 wherein the non-linear middle section is a ramp having an angle of inclination of 9 degrees or less.

10. The unit of claim 9 wherein the non-linear middle section is a ramp having an angle of inclination of 8 degrees or less.

11. The unit of claim 1 wherein the first moveable ramp section and the second moveable ramp section are both substantially linear.

12. The unit of claim 1 wherein the angle between the raised position of the craft entry/exit end and the lowered position of the craft entry/exit end is 16 degrees or less.

13. The unit of claim 1 wherein the unit comprises at least one support tower that bears load.

14. The unit of claim 13 wherein the unit comprises a first support tower that bears load from at least the non-linear middle ramp section.

15. The unit of claim 14 wherein the unit further comprises a second support tower that bears load from at least the first moveable ramp section.

16. The unit of claim 1 wherein the angle between the raised position of the ground entry/exit end and the lowered position of the ground entry/exit end is from 5 to 105 degrees.

17. The unit of claim 1 wherein the unit comprises one or more flight of steps.

18. The unit of claim 17 wherein the flight of steps extends from a point on the non-linear middle ramp section and, in use, can extend from the non-linear middle ramp section down to the ground.

19. The unit of claim 1 wherein the non-linear middle ramp section comprises an inclined ramp that has a fixed angle of inclination of from 2 to 10 degrees.

20. The unit of claim 1 wherein the non-linear middle ramp section comprises an inclined ramp that has a fixed angle of inclination of from 2 to 9 degrees.

21. The unit of claim 1 wherein the non-linear middle ramp section comprises an inclined ramp that has a fixed angle of inclination of from 3 to 10 degrees.

22. The unit of claim 1 wherein the non-linear middle ramp section comprises an inclined ramp that has a fixed angle of inclination of from 2 to 8 degrees.

* * * * *

UNITED STATES PATENT AND TRADEMARK OFFICE
CERTIFICATE OF CORRECTION

PATENT NO. : 8,839,475 B2  
APPLICATION NO. : 13/635261  
DATED : September 23, 2014  
INVENTOR(S) : Corfield Page 1 of 1

It is certified that error appears in the above-identified patent and that said Letters Patent is hereby corrected as shown below:

Title Page,
Item (75) should be changed to Item (76).
"(73) Assignee: Graham Corfield, Shropshire (GB)" should be deleted.

Signed and Sealed this  
Third Day of November, 2015

Michelle K. Lee  
*Director of the United States Patent and Trademark Office*